(12) United States Patent
Tu

(10) Patent No.: US 9,836,049 B1
(45) Date of Patent: Dec. 5, 2017

(54) RELAY DRONE SYSTEM

(71) Applicant: Pinnacle Vista, LLC, Upland, CA (US)

(72) Inventor: Haofeng Tu, Shanghai (CN)

(73) Assignee: Pinnacle Vista, LLC, Upland, CA (US)

( * ) Notice: Subject to any disclaimer, the term of this patent is extended or adjusted under 35 U.S.C. 154(b) by 0 days.

(21) Appl. No.: 15/588,282

(22) Filed: May 5, 2017

(51) Int. Cl.
| | | |
|---|---|---|
| G05D 1/00 | (2006.01) | |
| G05D 3/00 | (2006.01) | |
| G06F 7/00 | (2006.01) | |
| G06F 17/00 | (2006.01) | |
| H04W 64/00 | (2009.01) | |
| G08C 17/02 | (2006.01) | |
| B64C 39/02 | (2006.01) | |
| G01S 19/13 | (2010.01) | |
| H04W 84/00 | (2009.01) | |
| H04W 88/04 | (2009.01) | |

(52) U.S. Cl.
CPC ......... *G05D 1/0022* (2013.01); *B64C 39/022* (2013.01); *B64C 39/024* (2013.01); *G01S 19/13* (2013.01); *G05D 1/0088* (2013.01); *G08C 17/02* (2013.01); *H04W 64/003* (2013.01); *B64C 2201/024* (2013.01); *B64C 2201/122* (2013.01); *B64C 2201/141* (2013.01); *B64C 2201/146* (2013.01); *G08C 2201/42* (2013.01); *G08C 2201/91* (2013.01); *H04W 84/005* (2013.01); *H04W 88/04* (2013.01)

(58) Field of Classification Search
CPC .. G05D 1/0022; G05D 1/0088; B64C 39/022; B64C 39/024; B64C 2201/024; B64C 2201/122; B64C 2201/141; B64C 2201/146; G01S 19/13; G08C 17/02; G08C 2201/42; G08C 2201/91; H04W 64/003; H04W 84/005; H04W 88/04
USPC .......................................................... 701/2
See application file for complete search history.

(56) References Cited

U.S. PATENT DOCUMENTS

| | | | |
|---|---|---|---|
| 5,340,056 A | | 8/1994 | Guelman et al. |
| 5,521,817 A | * | 5/1996 | Burdoin ............... G05D 1/0027 244/190 |
| 6,122,572 A | | 9/2000 | Yavnai |
| 7,451,023 B2 | | 11/2008 | Appleby et al. |
| 7,673,831 B2 | | 3/2010 | Steele et al. |
| 8,464,816 B2 | | 6/2013 | Carrier |
| 8,570,150 B1 | | 10/2013 | Bowen et al. |
| 8,682,485 B2 | | 3/2014 | Anhalt et al. |

(Continued)

*Primary Examiner* — Calvin Cheung
*Assistant Examiner* — Paula L Schneider
(74) *Attorney, Agent, or Firm* — WPAT, P.C., Intellectual Property Attorneys; Anthony King

(57) ABSTRACT

Systems and methods are provided for a network of relay drones utilized as a set of relays or linkages between a base station and a working drone controlled by the base station. The relay drones in the network may augment a communication link or communication signal between the base station and working drone. Relay drones may augment the communication link by acting as nodes that relay communication between the base station and the working drone by boosting the communication signal at each node to compensate for loss of signal power over a traveled distance and/or providing a path with a direct line of sight between the base station and working drone. Directional antennas may be utilized when a direct line of sight is established, which may improve communication signal efficacy when compared with omnidirectional antennas.

27 Claims, 16 Drawing Sheets

(56) References Cited

U.S. PATENT DOCUMENTS

| | | |
|---|---|---|
| 8,973,860 B2 | 3/2015 | Beard |
| 9,590,298 B1* | 3/2017 | Buchmueller ............ H01Q 3/08 |
| 2012/0250010 A1* | 10/2012 | Hannay ................ G01N 21/952 |
| | | 356/237.1 |
| 2015/0334768 A1 | 11/2015 | Ranasinghe et al. |
| 2016/0016663 A1* | 1/2016 | Stanek .................... B60R 16/02 |
| | | 701/3 |
| 2016/0083115 A1* | 3/2016 | Hess ........................ B64F 3/02 |
| | | 701/3 |
| 2016/0340842 A1 | 11/2016 | Adams |
| 2016/0363929 A1 | 12/2016 | Clark et al. |
| 2016/0381541 A1 | 12/2016 | Akopian et al. |
| 2017/0052539 A1 | 2/2017 | Kerzner |
| 2017/0069214 A1 | 3/2017 | Dupray et al. |
| 2017/0150373 A1 | 5/2017 | Brennan et al. |
| 2017/0161972 A1* | 6/2017 | Moloney .............. G07C 5/0841 |

\* cited by examiner

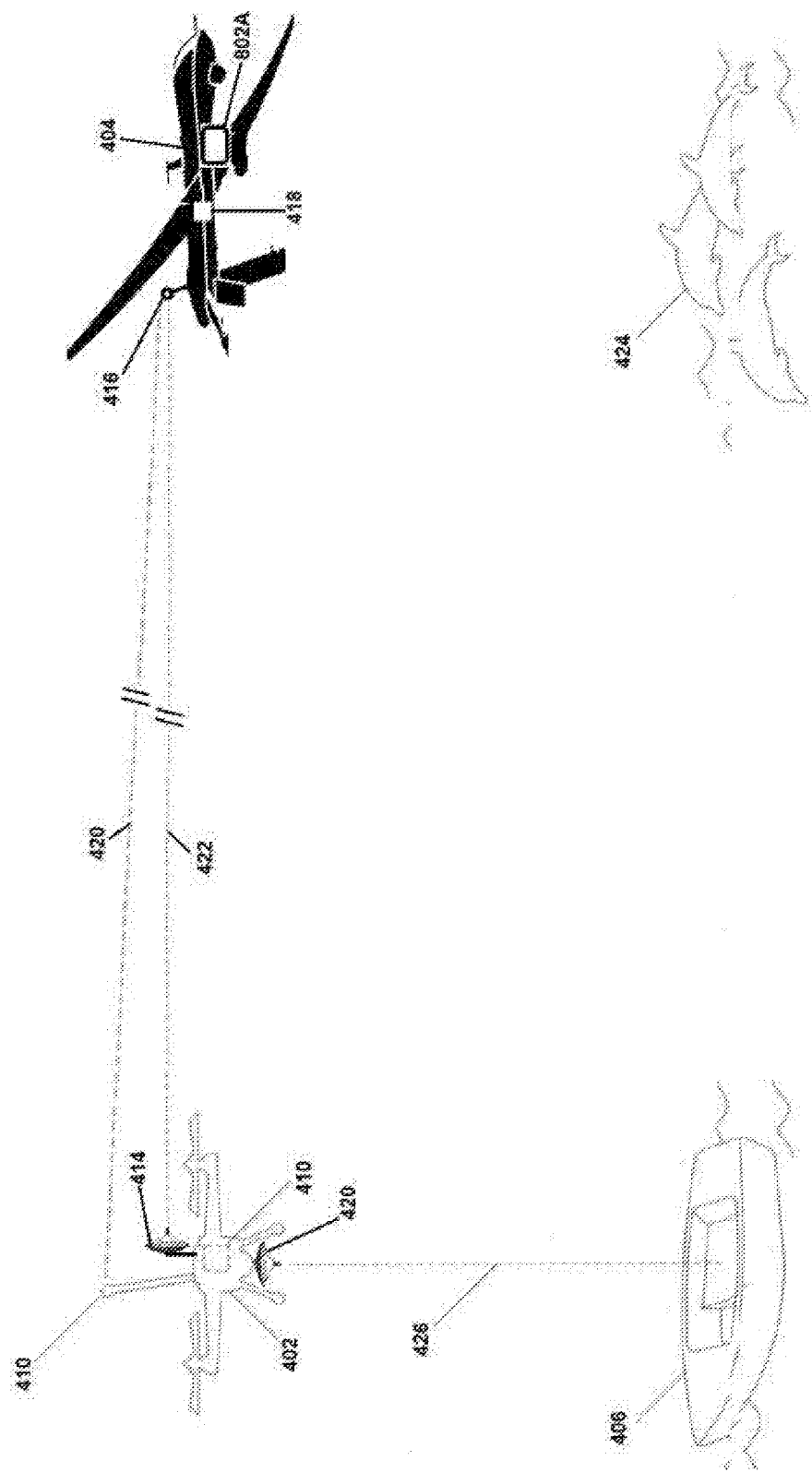

RELAY DRONE SYSTEM

FIELD

The present application relates generally to unpiloted devices such as drones, and more specifically to a system of a relay drones that relay data between a base station and a working drone.

BACKGROUND

Drones are unpiloted devices and may be used by the military, police, rescue, scientific, and commercial communities. One example of a drone is an unmanned device capable of controlled, sustained, and powered movement. As such, the designs of drones may consist of vehicles, aircraft, boats, submarines or spacecraft of various sizes, capabilities, and weights. A typical drone consists of a propulsion device, such as an engine, a navigation system, one or more sensors, and possibly cargo. For an aircraft or aerial drone, the sensors may provide information to a ground observer about the terrain the drone overflies, such as video information about a lost hiker in a rescue application, information from laser and/or biological sensors about environmental conditions in a scientific or security application, or a combination of video, laser, biological and other sensors concerning battlefield conditions in a military application. The cargo may be munitions, food, medicine, and/or other goods depending on the mission of the drone.

As the drone is unmanned, computer software executing on one or more processors aboard the drone partially or completely controls the drone. The computer software may control the various functions performed by the drone, perhaps with the aid of an observer.

There continues to be a need for expanded and more efficient uses of unmanned drones.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter in this specification are set forth in the accompanying drawings and the description below. Other features, aspects, and advantages will become apparent from the description, the drawings, and the claims. Note that the relative dimensions of the following figures may not be drawn to scale.

In a particular embodiment, a system includes at least one relay drone configured to: remain within a line of sight of a base station; remain within a line of sight of a working drone; pass a control signal received from the base station to the working drone, and pass a data signal received from the working drone to the base station.

In another particular embodiment, the at least one relay drone comprises: a first relay drone configured to remain within the line of sight of the base station; and a second relay drone configured to remain within the line of sight of the working drone, the first relay drone configured to remain within a line of sight of the second relay drone.

In another particular embodiment, the line of sight of the working drone comprises an unobstructed linear relationship sufficient for unidirectional wireless communication between the at least one relay drone and the working drone.

In another particular embodiment, the line of sight of the base station comprises an unobstructed linear relationship sufficient for a cable to be tethered between the at least one relay drone and the base station.

In another particular embodiment, a first distance between the at least one relay drone and the working drone is an order of magnitude greater than a second distance between the at least one relay drone and the base station.

In another particular embodiment, the at least one relay drone is configured to move in response to base station movement to remain within the line of sight of the base station.

In another particular embodiment, the at least one relay drone is configured to receive a relay drone control signal, from the base station, that controls the relay drone.

In another particular embodiment, the relay drone control signal is not passed to the working drone.

In another particular embodiment, the relay drone control signal configures the at least one relay drone to adopt an autonomous flight pattern within a set distance from the base station.

In another particular embodiment, the at least one relay drone includes: an omnidirectional antenna configured to receive a location signal from the working drone; a first directional antenna configured to receive the control signal; and a second directional antenna configured to send the control signal.

In another particular embodiment, the omnidirectional antenna is on an opposite end of the at least one relay drone relative to the first directional antenna.

In another particular embodiment, the base station is not within the line of sight of the working drone.

In another particular embodiment, the at least one relay drone is not a fixed wing drone.

In another particular embodiment, the at least one relay drone is a multi-copter drone.

In another particular embodiment, the at least one relay drone is a glider tethered to the base station.

In another particular embodiment, the at least one relay drone is configured to receive a location signal from the working drone. The location signal includes GPS coordinates and an altitude.

In another particular embodiment, the at least one relay drone is configured to: remain within a line of sight of a second working drone; pass a second control signal received from the base station to the second working drone; and pass a second data signal received from the second working drone to the base station.

In another particular embodiment, the at least one relay drone comprises a single drone configured to: pass the control signal received from the base station to the working drone via a first directional antenna on the single drone; and pass the second control signal from the base station to the second working drone via a second directional antenna on the single drone.

In another particular embodiment, the working drone is configured for autonomous flight.

In another particular embodiment, the working drone is configured for autonomous movement on ground.

In another particular embodiment, the working drone is a communication device.

In another particular embodiment, the at least one relay drone comprises a directional antenna that points below at the base station.

In another particular embodiment, the directional antenna is oriented with a gimbal.

In another particular embodiment, the at least one relay drone comprises a second directional antenna that points at the working drone.

In another particular embodiment, the second directional antenna is oriented with a second gimbal.

In another particular embodiment, the at least one relay drone is configured to move from a first location to a second location with increased signal reception with the base station relative to the first location.

In another particular embodiment, the signal is the control signal or the data signal.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein:

FIG. 4 illustrates an example relay drone interacting with a working drone using directional and omnidirectional antennas.

DETAILED DESCRIPTION

Figure 1:
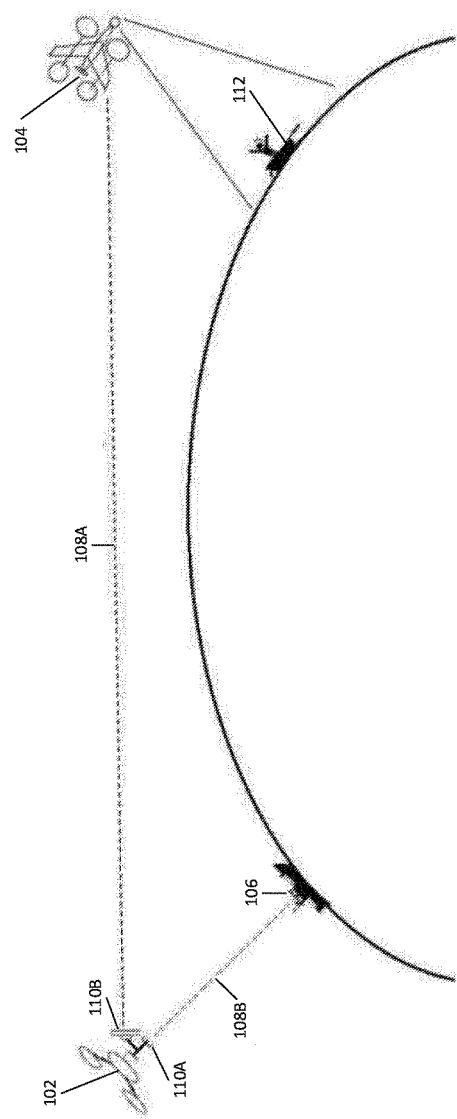
FIG. 1 illustrates an example of a relay drone interacting with a working drone.

Generally described, aspects of the present disclosure relate to systems and methods of at least one relay drone utilized to relay information between at least one base station and at least one working drone. While the specification describes specific examples of base stations, relay drones and working drones, the system and methods can be modified for any configuration of relay drones that may be controlled individually, or as a group, and pass information between a base station and a working drone.

In this specification, drones include any unmanned vehicle, such as an unmanned aerial vehicles (UAV), unpiloted aerial vehicle, remotely piloted aircraft, unmanned aircraft systems, any aircraft covered under Circular 328 AN/190 classified by the International Civil Aviation Organization, and so on. As an example, the drone may be in the form of a single or multi-rotor copter (e.g., a quad-copter) or a fixed wing aircraft. In addition, certain aspects of the disclosure can be utilized with drones in the form of other types of unmanned vehicles (e.g., wheeled, tracked, and/or water vehicles).

As described, a network of relay drones can be utilized as a set of relays or linkages between a base station and a working drone controlled by the base station. The relay drones in the network may augment a communication link or communication signal between the base station and working drone. In certain embodiments, relay drones may augment the communication link by acting as nodes that relay communication between the base station and the working drone by boosting the communication signal at each node to compensate for loss of signal power over a traveled distance and/or providing a path with a direct line of sight between the base station and working drone. Directional antennas may be utilized when a direct line of sight is established, which may improve communication signal efficacy when compared with omnidirectional antennas.

Furthermore, base stations and/or relay drones may utilize a communication protocol to initialize interaction with available relay drones and/or working drones. For example, in certain embodiments, available relay drones and/or working drones may transmit location information. This location information may be transmitted via an omnidirectional antenna; a directional antenna calibrated to a location of a base station, working drone, or relay drone; or a directional antenna executing a sweeping pattern across a space. Examples of omnidirectional antennas may include dipole antennas or monopole antennas. Examples of directional antennas may include dish antennas, parabolic antennas, yagi antennas, quad antennas, billboard antennas, lasers or helical antennas. Base stations and/or relay drones seeking to utilize available relay drones and/or working drones may receive the location information and transmit signals to the location of the available relay drones and/or working drones. These signals may be control signals that control a base station and/or relay drone or data signals that indicate an operational status or content captured by a working drone or relay drone. These control signals may be transmitted via an omnidirectional antenna or a directional antenna calibrated to the location of the available relay drones and/or working drones. Also, data signals from the available relay drones and/or working drones may be received from the omnidirectional antenna or a calibrated directional antenna. The data signals may be generated in response to a control signal and/or may be intended for receipt by a base station. Additionally, available relay drones and/or working drones may interact with base stations and/or other relay drones by transmitting location information so that the base station and/or other relay drones may send the available relay drone and/or working drone a control signal or data signal. In certain embodiments, a drone may be utilized either or both as a relay drone (when relaying communication) or a working drone (with collecting data for return to a base station). In certain embodiments a control signal may include a location signal that includes location information that can be utilized for establishment of a communication link, such as locations of a node (e.g., base stations, relay drones, working drones) or an antenna of a node of the relay drone network.

Relay drones can be utilized to maintain a broadband communication connection between a base station and at least one working drone, even if the base station, working drone, and/or relay drone is moving. This is also possible when the base station and working drone are separated, such as where there is no line of sight between the base station and working drone. Although the base station and working drone may be separated, a link can be maintained between the two via at least one relay drone. The relay drone can be stationary or be in motion so long as the relay drone maintains a line of sight with the base station and/or working drone. Maintaining a line of sight between each of the nodes of the relay drone network (such as between at least one base station, relay drone, and working drone) advantageously allows for more effective and efficient communication using directional antennas rather than omnidirectional antennas that may waste energy and signal strength through signal propagation in a direction known to not have a base station, relay drone, and/or working drone. This advantage is acute when communication requiring a high bitrate, such as streaming live 4K+ video (e.g., resolution of 8.3+ megapixels), is desired. Also, a base station that communicates with a working drone via a relay drone may advantageously increase a working drone operating range to higher altitudes or greater distances while maintaining a strong connection link (via directional antennas or a direct line of sight between each of the base stations, relay drones, and working drones). Operation at such higher altitudes or greater distances that may overcome limitations presented by environmental factors (such as loss of a line of sight due to the curvature of the earth as illustrated in FIG. 1). In certain embodiments, such communication links may be wireless while in other embodiments, such communication links may be wired, while in yet other embodiments such communication links may be a combination of wireless and wired linkages. In certain embodiments, communication links may be continuously sending and/or receiving information, such as by refreshing several times per second.

In certain embodiments, a line of sight can be maintained by controlling the relay drone to remain within a distance of a node of the relay drone network (e.g., base stations, relay drones, working drones) when the airspace or line of sight between the relay drone to another node of the relay drone network is known to be clear (as opposed to have to relay drone move beyond the horizon from another node of the relay drone network). Also, a line of sight can be maintained by controlling the relay drone to avoid known obstacles between the relay drone and another node in the relay drone network, such as where avoiding navigation into a region known to not have line of sight to another node in the relay drone network. These known obstacles may be sensed on the fly by nodes of the relay drone network utilizing sensors that can sense the surroundings of the nodes or from predetermined information concerning the surroundings of the nodes, such as maps or other geospatial information.

In certain embodiments, the relay drone network may dynamically change a line of sight path from a base station to a working drone. For example, a base station may communicate with a working drone via a first working drone. However, the first working drone may have a limited operational time or suffer technical difficulties and be taken out of commission. Thereby, a second relay drone may be brought into the relay drone network so that the base station may communicate with the working drone via the second relay drone rather than the first relay drone. Also, reception from or to relay drones may falter, such as due to environmental factors or obstacles that come in-between nodes in the relay drone network, and other relay drones may take the place of the faltering relay drone in the relay drone network to relay communication between a base station and a working drone.

Furthermore, the relay drone can autonomously maintain a navigational pattern relative to either the base station, another relay drone, and/or working drone such that the line of sight between these nodes in the relay drone network are preserved and each node can constantly and easily monitor another node. For example, by maintaining a line of sight and or proximity between nodes of the relay drone network, failure at any node of the relay drone network can be more quickly recognized and addressed, such as by sending a replacement working drone and/or relay drone to replace a failed working drone and/or relay drone. Additionally, a relay drone may maintain a relatively close distance with a base station while maintaining contact with a relatively distant working drone. In certain embodiments, the distance at which a relay drone may operate from a base station may be set to be as close as possible or as close as reasonable given environmental or operational constraints, such as to maintain a safe operational distance from the base station to avoid crashing into the base station. Advantageously, maintaining a relay drone at a closest possible distance may enable replacement of a relay drone also to be as expedient as possible.

In certain embodiments, a relay drone can be a multi-rotor platform capable of vertical take off and landing (VTOL). Accordingly, the relay drone with VTOL capabilities can operate without need of a runway and more easily be launch from a base station, or location proximate to a base station, without a runway. VTOL relay drones may also be closer to a ground base station than a fixed wing relay drone.

In certain embodiments, a directional antenna can be attached to a drone and movable along a single axis, as opposed to other embodiments where the directional antenna is movable along multiple axes. A drone with an antenna movable along a single axis advantageously reduces the amount of hardware (such as motor, gear, and transmission components) that operates the directional antenna, advantageously reducing weight, power consumption and/or complexity of the drone while the antenna is calibrated to another node in the relay drone network (such as a base station, relay drone, or working drone) even while moving. This may result in increased or improved operational time due to conservation of energy usage. In certain embodiments, the single axis that a directional antenna may be movable along may be a pitch axis and movement along anther axis, such as a yaw axis, may be accomplished by moving an entire drone along the yaw axis, rather than just the directional antenna. Accordingly, this combination of movement along the yaw axis and the pitch axis provides a sufficient degree of freedom for a directional antenna to point at any spatial location away from a drone. Furthermore, such a combination of movement offers a stable data link by not tilting the drone and maintaining a parallel to horizontal position. By not tilting the drone, or otherwise affecting the drone's horizontal orientation, the drone may be less sensitive to environmental displacements, such as due to wind, rain, or air friction. These features may provide further advantages such as operation at higher altitudes or greater communication distance coverage while maintaining drone operational stability.

In certain embodiments, drones (such as relay drones or working drones) may include a lightning rod.

FIG. 1 illustrates an example of a relay drone 102 interacting with a working drone 104 and a base station 106. The relay drone 102 may be actively controlled by the base station or autonomously configured to remain within a line of sight of the base station 106. The relay drone 102 may be in a Follow Me mode where the relay drone 102 monitors the location of the base station 106 and maintains a location within a distance either above the location of the base station or behind the base station 106 as the base station 106 moves. For example, the base station 106 may transmit location information (a GPS location signal or other signal) to the relay drone 102. A processor accessible to the relay drone may utilize the received location information to autonomously construct a route for the relay drone 102 to follow above or behind the base station 106.

In certain embodiments, the relay drone 102 may autonomously sense the location of the base station 106 when engaging in a Follow Me mode without need for the base station 106 to actively broadcast its location. For example, the relay drone 102 may rely upon sensors on the relay drone 102 to locate the base station 106 (such as by image edge detection after a base station is identified in an image) or may follow a signature detectible from the base station 106 (such as a unique and trackable shape or color on the relay drone).

The relay drone 102 may be connected to the base station 106 and the working drone 104 via communication links, such as a base station communication link 108B and a working drone communication link 108A. In certain embodiments, the communication links may include a control signal and/or a data signal passed between the base station 106, relay drone 102, and working drone 104. For example, a control signal may be passed from the base station 106 to the relay drone 102, or between the relay drone 102 and the working drone 104, that controls an aspect (such as a flight or navigation pattern, instrumentation use or communication protocol use) of the relay drone 102 or the working drone 104. Also, a data signal (such as a video signal, drone status notification, or audio signal) may be passed from either the working drone 104 and/or the relay drone 102 to the base station. The communication link may be composed of any type of communication protocol from which devices can communicate with each other, such as one or combinations of infrared (IR) wireless communication, broadcast radio, satellite communication, microwave wireless communication, microwave radio, radio frequency, Wi-Fi, Bluetooth, Zigbee, GPC, GSM, RFID, OFDM or the like.

The communication links 108A, 108B can be effectuated by directional antennas or omnidirectional antennas. As the relay drone 102 can maintain a line of sight between the base station 106 and the working drone 104, directional antennas can be utilized at the ends of the base station communication link 108B between the relay drone 102 and base station 106 (via a directional antenna at the relay drone 102 pointing to the base station 106 and/or a directional antenna at the base station 106 pointing to the relay drone 102). Also, directional antennas can be utilized at the ends of the working drone communication link 108A between the relay drone 102 and the working drone 104 (via a directional antenna at the relay drone 102 pointing to the working drone 104 and/or a directional antenna at the working drone 104 pointing to the relay drone 102). Usage of directional antennas at the end of the communication link 108B, 108A, can increase an effective use of signal strength and communicate either with greater signal strength at a same distance or at a same signal strength at greater distances when compared to a system that utilizes omnidirectional antennas without directional antennas.

Although a single antenna may be at the end of a communication link, multiple antennas and/or multiple types of antennas may also be utilized at the ends of a communication link. For example, both omnidirectional and directional antennas may be utilized at an end of a communication link, such as where certain types of data signals or control signals are passed using the omnidirectional antenna while other types of data signals or control signals are passed using the directional antenna. In certain embodiments, both directional and omnidirectional antennas can be utilized at different ends end of a communication link, such as where the relay drone 102 utilizes a directional antenna 110A pointed at the base station 106 to communicate with the base station 106, but the base station 106 utilizes an omnidirectional antenna to communicate with the relay drone 102 and/or where the relay drone 102 utilizes a directional antenna 110B pointed at the working drone 104 to communicate with the working drone 104 but the working drone 104 utilizes an omnidirectional antenna to communicate with the relay drone 102. Usage of both directional and omnidirectional antennas at the end of the communication link 108B, 108A, can increase an effective use of signal strength for the limited resources of the relay drone 102, where the relay drone 102 can communicate either with greater signal strength at a same distance or at a same signal strength at greater distances when compared to a relay drone that utilizes omnidirectional antennas without directional antennas. In further embodiments, the relay drone can utilize a combination of directional and omnidirectional antennas, such as where the relay drone 102 utilizes an omnidirectional antenna to detect a signal indicating a location of the working drone 104 (and/or an antenna on the working drone 104) and/or a signal indicating a location of the base station 106 (and/or an antenna on the working drone 106). Also, the distance across the communication link 108A, 108B can be closer than a communication link via a satellite in space, advantageously allowing the system of relay drones to more effectively transmit large amounts of data, such as via wide band communication, when compared to communication using satellites in space.

In certain embodiments, omnidirectional antennas can be utilized at both ends of the communication link 108A, 108B. These omnidirectional antennas can transmit control data with lower bitrate compared with a data signal that includes content, such as audio and/or video content. Also, the omnidirectional antennas can utilize a narrow band signal for the control data (in contrast to a wide band signal that can be utilized for a data signal that includes content). In certain embodiments, the control signal transmissions using omnidirectional antennas can include locational data for the working drone 104 (and/or an antenna on the working drone 104), the relay drone 102 (and/or an antenna on the relay drone 102), and/or the base station 106 (and/or an antenna on the base station 106). After receipt of the locational data, a directional antenna can be calibrated to the location for more effective data transmission to the location. For example, after the relay drone 102 has received locational data for the working drone 104, the relay drone 102 can adjust the direction of its directional antenna 110B towards the working drone 104 to receive a much larger data signal (e.g., video data sent from the working drone 104) via a wide band connection.

The working drone 104 may be configured to be operational for an extended period, such as for 6-10 hours or 8+ hours, to perform a variety of tasks at the command of the base station 106. The tasks may be performed by the working drone 104 executing a command or task in a control signal sent from the base station 106 and relayed via the relay drone 102 through the communication link 108A, 108B. In certain embodiments, the working drone 104 may be retired at the end of the operational period and a new working drone installed in its place. The retired working drone may return to the base station 106 or other mobile or stationary stations for maintenance (e.g., to recharge batteries and perform repairs) and the new working drone may be launched from the base station 106 or other mobile or stationary stations.

In certain embodiments, the working drone may be tasked with providing a visual ahead of where a moving object (e.g., boat, car, bicycle, helicopter) is going. The moving object may be the base station 106 or a moving object different than the base station 106. In certain embodiments, the working drone 104 may be tasked with providing a visual of a location and sending data with the visual back to the base station 106. The visual may be of possible rocks or icebergs in water, damaged or washed away roads, shipwrecks, refugees in the water or land, floating objects, packs of wild animals, floating cargo or debris, oil spills, weather conditions, visual manifestations of temperature changes, people in need of rescue, other moving objects and the like. In the illustrated embodiment, the working drone 104 may be tasked with visualizing an area encompassing a vessel 112.

In certain embodiments, the working drone 104 may be tasked with performing an active role at a location. The location can be local to or distant from the base station 106. This active role can be delivering cargo or a payload, such as dropping medical supplies, food supplies and/or a life saver. This active role may also be engaging in a search for an item (such as a vessel, a school of fish, or a missing person) or performing a rescue mission. These active roles may be performed automatically via a predetermined task protocol identified in a working drone control signal (such as by maintaining a holding pattern over an object while visualizing a selected object or dropping cargo at a location proximal to the object in an automated fashion) or as directly controlled by the base station 106 (such as by maintain a holding pattern over an object while visualizing the object or dropping cargo at a location proximal to the object under real time control of the base station 106). In the illustrated embodiment, the working drone 104 may be tasked with dropping a life saver for the vessel 112 that is at a location distant from the base station 106 and beyond the line of sight of the base station 106.

Directional antennas may be stabilized on a gimbal. In certain embodiments, at least one directional antenna 110A, 110B on the relay drone 102 may be on a 2-axis gimbal for stability in receiving and sending signals, such as to and from the working drone 104 or the base station 106. Other types of gimbal such as a 1-axis gimbal, 3-axis gimbal, or other types of known devices to compensate for movement (such as drone movement) can be used for stability in receiving and sending signals. Additionally, any directional antenna, whether on the relay drone 102, the working drone 104, or on the base station 106, can be set on a 1-axis gimbal, 2-axis gimbal or a 3-axis gimbal for stability in receiving and sending signals. Other types of known devices to compensate for movement can be used for stability in receiving and sending signals, such as vibration dampening foam or springs.

In certain embodiments, the relay drone 102 may land on the base station 106. The relay drone 102 may land on the base station 106 for periodic servicing, recharging, storage, and/or maintenance. Also, the working drone 104 can land on the base station 106. The working drone 104 can land on the base station 106 for periodic servicing, recharging, downloading of data, storage, and/or maintenance. Optionally, the working drone 104 and/or the relay drone 102 can be launched from the base station 106. The base station 106 may have a number of relay drones 102 and/or working drones 104 onboard so that even if each relay drone 102 and/or working drone 104 has a limited flight time, the base station 106 may rotate different relay drones 102 and/or working drones 104 for operation so that there is always a working drone 104 and/or a relay drone 102 operational or in the air while others are serviced or stored.

Although FIG. 1 illustrates only one relay drone 102, as will be discussed further below, multiple relay drones 102 may be utilized to create a network of relay drones 102 that provides a path, via the network of relay drones 102, with a direct line of sight between a base station 106 and a working drone 104. Also, one or more base stations 106 may utilize at least one relay drone 102 to communicate with one or more working drones 104. Furthermore, one or more working drones 104 may utilize at least one relay drone 102 to communicate with one or more base stations 106. Additionally, a drone may function as a relay drone 102 for a base station 106 at one time (to communicate with a working drone) and may function as a working drone 104 at a different time (to execute a command and not relay the command to a different drone). Also, a drone may interact with multiple base stations 106 to function as a relay drone 102 for one base station 106 and a working drone 104 for another base station 106. This type of networking may make the transmission of data and/or execution of tasks both faster and easier than without such a network.

Generally, both the relay drone 102 and the working drone 104 are contemplated to be unmanned and autonomous (not requiring constant and/or real time control).

It should be particularly noted that the silhouette illustration of the drones and base station in FIG. 1 is not intended to limit the type of drone and/or base station or model of drone and/or base station in contemplated embodiments. For example, although the relay drone 102 is illustrated as a multi-copter drone, the working drone 104 is illustrated as a fixed wing drone and the base station 106 is illustrated as a watercraft, each of the relay drone 102, working drone 104, and/or base station 106 may feature a form factor of any stationary or moving object, such as a floating or submerged watercraft, land vehicle, consumer electronic device, or an aerial vehicle (e.g., an airplane, a helicopter, a blimp). Further, the contemplated method and device can be used to transmit data to and from (or between) a moving object or a stationary object (such as a building).

Figure 2:
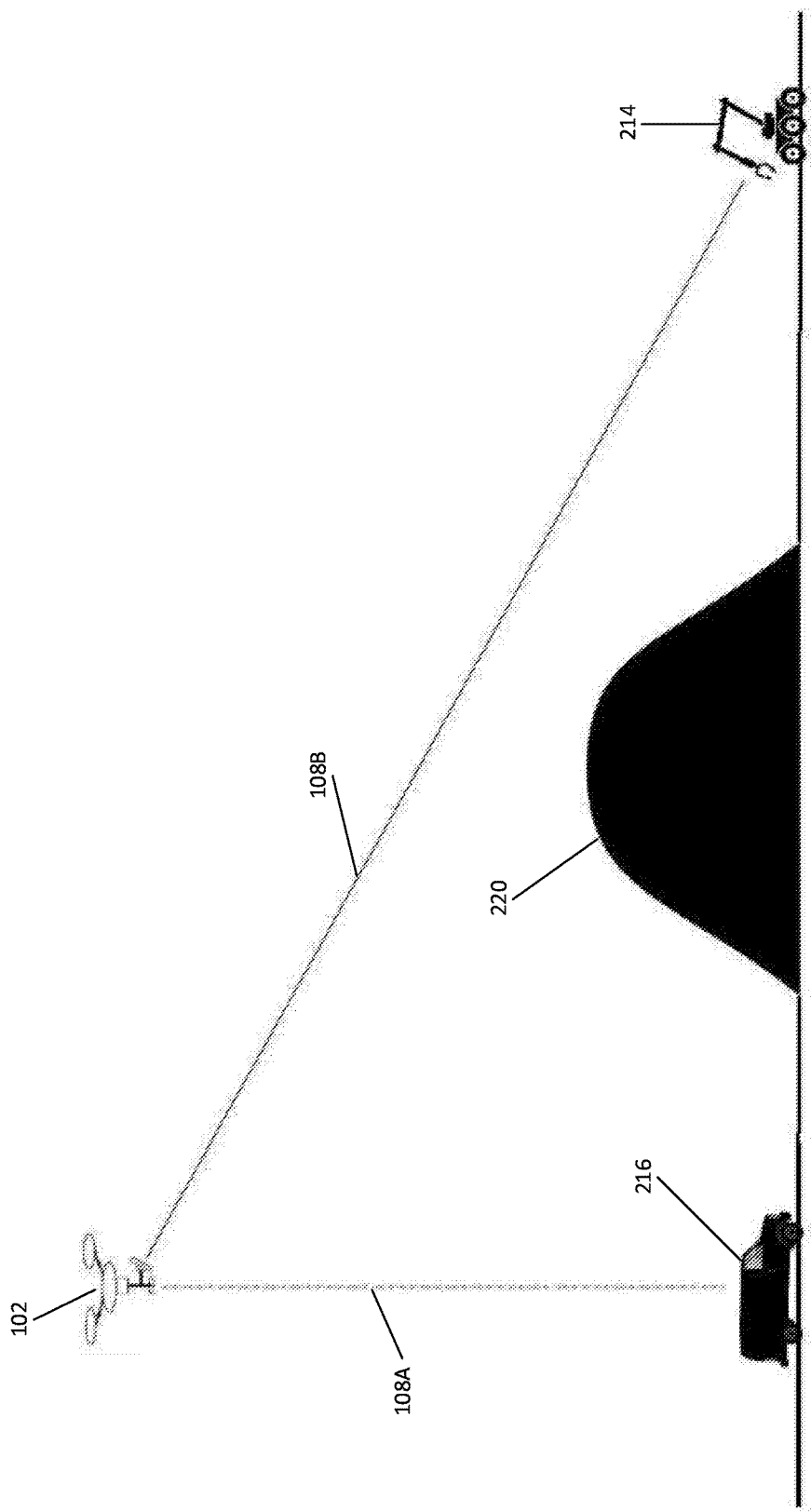
FIG. 2 illustrates an example of an aerial relay drone interacting with a ground vehicular working drone.

FIG. 2 illustrates an example of the relay drone 102 interacting with a ground vehicular working drone 214 and a ground vehicular base station 216. The base station 216 does not have a line of sight to the working drone 214 due to an obstacle 220 between the working drone 214 and the base station 216. However, the relay drone 102 has a line of sight to both the working drone 214 and the base station 216. Accordingly, the base station 216 can utilize the relay drone 102 to establish a communication link 108A, 108B along a path with a direct line of sight between the base station 216 and the working drone 214.

Figure 3:
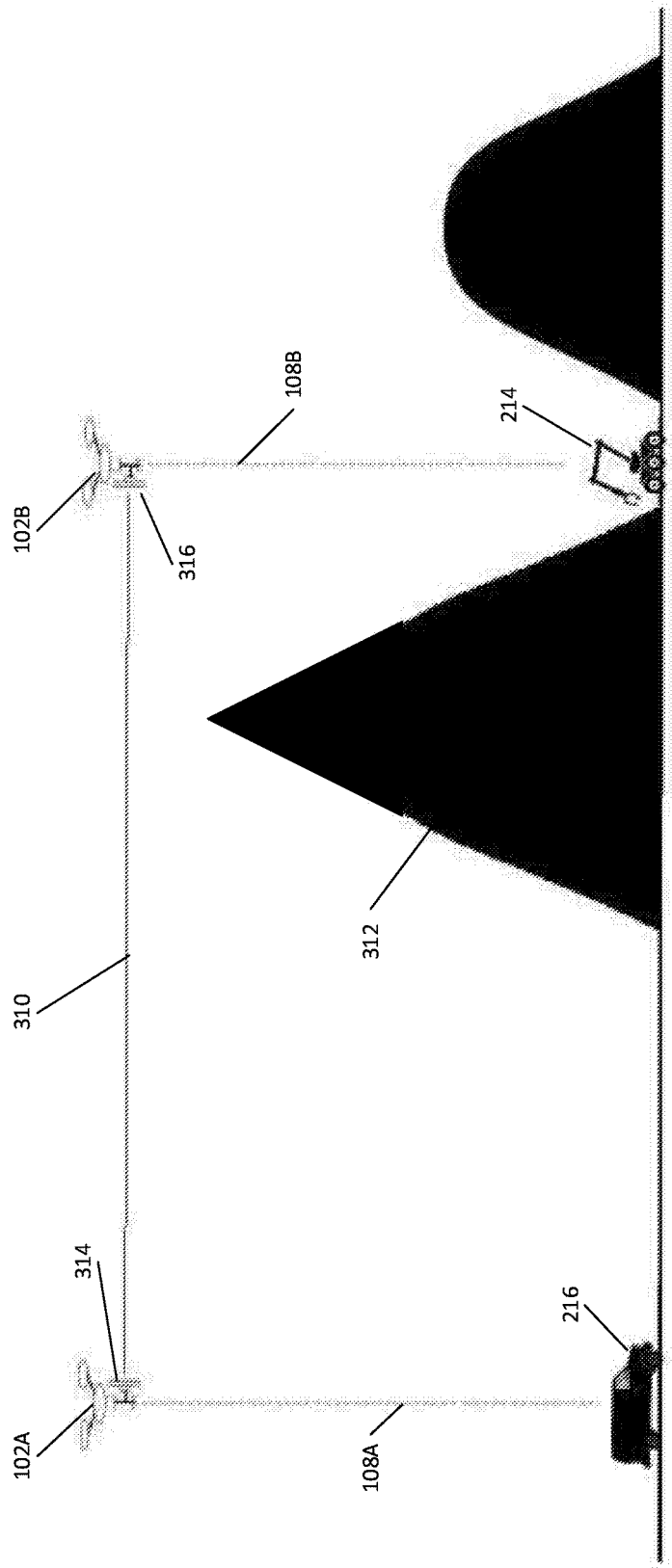
FIG. 3 illustrates an example of a system of multiple relay drones.

FIG. 3 illustrates an example of a system of multiple relay drones 102A, 102B. In the illustrated embodiment, an obstacle 312 between the base station 216 and the working drone 214 precludes establishment of a path with a direct line of sight between the base station 216 and the working drone 214 with one relay drone. Therefore, multiple relay drones 102A, 102B can be utilized to establish a path with a direct line of sight between the base station 216 and the working drone 214.

An additional relay drone communication link 310 can be established between the two relay drones 102A, 102B in addition to the communication link 108A between the relay drone 102A and the base station 216 and the communication link 108B between the relay drone 102B and the working drone 214. The relay drone communication link 310 can be established utilizing same or different communication protocols as the communication link 108A or the communication link 108B. The relay drone communication link 310 can have directional antennas 314, 316 at both ends, with a combination of directional antennas and omnidirectional antennas or with omnidirectional antennas at both ends. The calibration of the directional antennas at a relay drone can be established by first identifying a location of the other relay drone (or a location of an antenna of the other relay drone) via receipt of a location signal (for the other relay drone or the an antenna of the other relay drone) using an omnidirectional antenna. Subsequently, the relay drone can calibrate the directional antenna of the relay drone to the location of the other relay drone (or the other relay drone's antenna). Each relay drone 102A, 102B can transmit its location (or the location of at least one of its antennas) via an omnidirectional antenna or a directional antenna (such as by a directional antenna transmitting the location information in a sweeping pattern that covers different areas at different times). In certain embodiments, a relay drone 102A. 102B can transmit a location signal that is received by a base station 216 and/or a working drone 214 and used by the base station 216 and/or working drone 214 to determine the location of the relay drone 102A, 102B (or the relay drone's antenna(s)) for establishment of a communication link with the relay drone 102A, 102B.

In certain embodiments, communication links between two nodes may utilize a communication protocol that is the same or different than communication protocols used in communication links between other nodes of the relay drone network. For example, a base station communication link may utilize a communication protocol that is wired while a working drone communication link may utilize a communication protocol that is wireless (e.g., WiFi) while a relay drone communication link may utilize a wireless communication protocol (e.g., ZigBee) that is different than the wired communication protocol used by the working drone communication link.

In certain embodiments, any of the nodes of the relay drone network (e.g., land vehicle base station, working drone, or relay drone; watercraft base station, working drone, or relay drone; stationary base station, working drone, or relay drone; aerial base station, working drone, or relay drone; or handheld base station, working done, or relay drone) can optionally have a communication module using LTE, satellite, or any wireless communication capability (hardware and/or software) currently known or to be developed in the future. Having this optional connectivity can further ensure optimal, reliable, and timely real-time connectivity of any of these communication points, or nodes, to each other within its relay drone network, or to other networks (e.g., the Internet) outside of this relay drone network.

In certain embodiments, any of the above communication points or nodes of the relay drone network can select (either autonomously or non-autonomously), in real time, different communication types or protocols. This selection can be based on criteria such as cost of transmission, reliability of transmission, speed of transmission, reception of transmission, or security of the transmission. For example, the base station, relay drone and working drone system can communicate directly with each other without use of an outside node (such as a cell phone tower or orbital satellite outside of the nodes of the relay drone network), and/or communicate indirectly with each other using outside nodes (such as a cell phone tower or orbital satellite). Also, as the base station, relay drone and/or the working drone travels through regions amenable to certain types of communication protocols (such as LTE), the base stations relay drone and/or working drone would operate with different communication protocols (such as LTE), such as for lower cost of communication and/or higher reliability in a low-altitude airspace.

In certain embodiments, a base station, relay drone, and working drone system can communication with each other directly but also be in communication with an external actor (such as a command post, headquarters, police station, or other base station). This communication with an external actor can be in real time while the base station, relay drone, and/or working drone are in communication with each other. This communication can also be directly and/or indirectly with same or different communication protocols used between the base station, relay drone, and/or working drone.

Furthermore, while various specific types of antennas have been disclosed herein, other embodiments can include a combination of antennas with different power levels to provide a variety of transmission distances that are most optimal for the distance and the type of data to be transmitted.

FIG. 4 illustrates an example relay drone 402 interacting with a working drone 404 using directional and omnidirectional antennas. In the illustrated embodiment, the relay drone 402 is networked with the working drone 404 and a base station 406. The relay drone 402 is configured to follow the base station 406 and maintain a position above the base station 406 and within a line of sight of the base station 406 as the base station 406 is in motion or as the relay drone 402 is in motion. The communication links 426, 422, 420 may be sufficient for high bitrate data transfer, such as for 4K+ streaming video of a target (such as the pod of dolphins 424) generated at the working drone 404 and delivered to the base station 406. The base station 406 may be moving and/or connected with a moving body such as a watercraft in the illustrated embodiment. The base station 406 may share a base station communication link 426 with the relay drone where control signals are sent to the relay drone 402 and a data signal is received from the relay drone 402. In addition to maintaining a line of sight with the base station 406, the relay drone 402 may maintain a set distance from the base station 406 and/or remain within a line of sight of the working drone 404.

As illustrated, the relay drone 402 may include a global positioning system (GPS) unit 410. Although a GPS unit 410 is utilized in the illustrated embodiment, any type of location unit able to determine a location may be utilized in lieu of or in conjunction with the GPS unit 410, such as a location sensor, altimeter, compass, inertial navigation system (INS), motion sensors (such as an accelerometer), rotation sensors (such as gyroscopes). For example, a location may be a GPS coordinate with an altitude determined from an altimeter. The relay drone 402 may also include an omnidirectional antenna 410 and a directional antenna 414. The working drone 404 may include an omnidirectional antenna 416 and a GPS unit 418. The communication links 420, 422 with the working drone 404 using the omnidirectional antenna 410 (omnidirectional drone communication link) and directional antenna 414 (directional drone communication link) may be part of a working drone communication link, introduced above and discussed further below.

On the working drone 404, the GPS unit 410 may determine a location for the working drone. That location, encoded as location information 420 in a location signal, can be transmitted via the omnidirectional antenna 416 of the working drone 404 and received by the omnidirectional antenna 410 of the relay drone 402. The relay drone 402 can then determine the location of the working drone 404, by decoding the location from the location signal, and calibrate the directional antenna 414 to point at the working drone 404. The relay drone 402 can then communicate with the working drone 404 using the calibrated directional antenna 414, such as by receiving a high bitrate data signal 422 (e.g., a 4K+ video stream).

In certain embodiments, the omnidirectional antenna 410 can be utilized to communicate control information to the omnidirectional antenna 416 of the working drone 404, such as by relaying control information for the working drone 404 received from the base station 406 that assigns a task or controls an aspect (e.g., a flight pattern or instrument operation) of the working drone 404, while the directional antenna 414 receives the data signal (which may be of a higher bitrate than the control signal). In other embodiments, the directional antenna 414 can also be utilized to communicate control information with the working drone 404.

In certain embodiments, the omnidirectional antenna 410 of the relay drone 402 receives the location information from the working drone but communicates with the working drone 404 using the directional antenna 414.

In certain embodiments, the working drone 404 may include a directional antenna (not shown) and may receive location information from the relay drone 402 via the omnidirectional antenna 416 and then calibrate a directional antenna (not shown) at the working drone 404 to the location of the relay drone 402 for communication with the relay drone, such as by transmitting a high bitrate data signal.

In certain embodiments, the single relay drone 402 may communicate with multiple working drones and receive location information from each working drone at the omnidirectional antenna 410 and calibrate the directional antenna 414 to point at each of the working drones at different times (e.g., to perform time division multiplexed communication) or by calibrating different directional antennas to each location to communicate with each of the working drones.

In certain embodiments, multiplexed communications may be advantageous over non multiplexed communications in order to reduce the number of antennas (and associated weight) on a drone.

In certain embodiments, a relay drone may include at least one antenna for communication with other drones (e.g, other relay drones and/or working drones) on one side of the relay drone and at least one antenna for communication with a base station on an opposite side of the relay drone. For example, in the illustrated embodiment, the antennas 410, 414 for communication with the working drone 404 are on the top of the relay drone 402 while the antenna 426 for communicating with the base station 406 is on the bottom side of the relay drone 402. In one particular embodiment, antenna 426 is a directional antenna pointed towards the base station 406. Advantageously, locating these different antennas on different sides of the relay drone 402 can reduce the interference between the antennas and provide more room for antenna movement or rotation when compared to collocating multiple antennas in a same place.

Figure 5B:
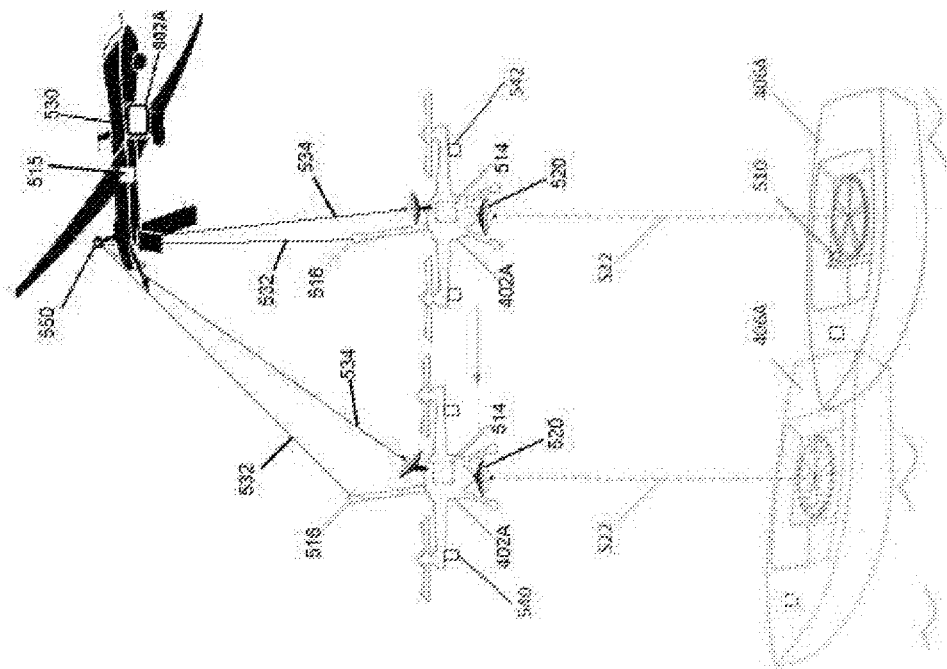
FIGS. 5A and 5B illustrate an example of a relay drone executing a navigational command with a moving base station.
Figure 5A:
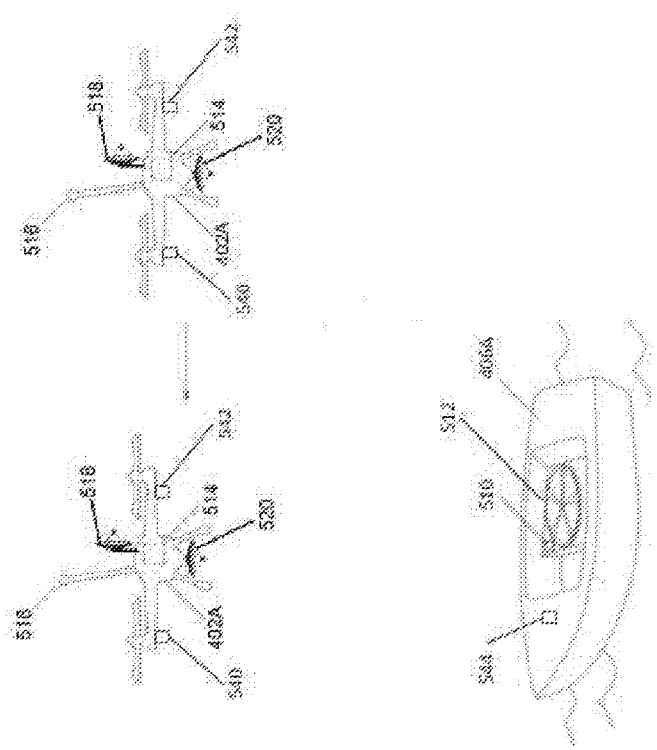

FIGS. 5A and 5B illustrate an example of a relay drone executing a navigational command with a moving base station. The relay drone 402A in FIGS. 5A and 5B is the same as the relay drone 402 in FIG. 4 except that a light emitter 540 and a light detector 542 is now illustrated with the relay drone 402A. The base station 406A in FIGS. 5A and 5B is the same as the base station 406 in FIG. 4 except that the GPS unit 510, an antenna 512, and a reflective unit 544 are now illustrated for the base station 406A. The movement of the relay drone 402A to a subsequent position and the movement of the base station 406A to a subsequent position is illustrated with a dashed line silhouette of the relay drone 402A or base station 406A.

FIG. 5A illustrates an example of a relay drone 402A executing a navigational command with a moving base station 406A to remain within a vicinity of the base station 406A. As illustrated in FIG. 5A, the relay drone 402A is configured to be positioned above the base station 406A (in the form of a watercraft). The relay drone 402A includes a GPS unit 514 an omnidirectional antenna 516, a drone facing directional antenna 518, and a base station facing directional antenna 520.

The relay drone 402A is in communication with the base station 406A and receives a location signal that encodes GPS coordinates determined by a GPS unit 510 on the base station 406. In response to receiving and decoding the location signal to determine the GPS coordinates, the relay drone 402A may move from a current location (shown as the relay drone 402A on the right in FIG. 5A) to a new location (shown as the relay drone 402A on the left in FIG. 5A) that is substantially above the received GPS coordinates. Accordingly, the relay drone 402A may substantially remain above or behind (following) the base station by changing locations as the base station moves.

In certain embodiments, the relay drone 402A may include a light emitter 540 and a light detector 542. The light emitter may be a LED or a laser. The light detector may detect light from the light emitter reflected back from the reflective unit 544 of the base station 406. The light detector may be a photodiode and/or a photodiode array. The reflective unit may be a mirror (e.g., a plain mirror or a curved mirror). The relay drone 402A may sense the reflected light from the reflective unit 544 to determine the location of the base station 406A and/or confirm the location information received from the base station 406A.

FIG. 5B illustrates an example of the relay drone 402A executing a navigational command with a moving base station 406A while also communicating with a working drone 530. The working drone may include a working drone omnidirectional antenna 550 and a GPS unit 515. As introduced above, the relay drone 402A may utilize the omnidirectional antenna 516 to receive a working drone location signal via a drone omnidirectional communication link 532 from which the relay drone 402A can receive information on, or determine a location for the working drone 530. The relay drone 402A can then calibrate the drone facing directional antenna 518 to the location of the working drone 530 and communicate with the working drone via a high bitrate signal over a drone directional communication link 534 (such as by receiving streaming 4K+ video content).

The base station 406 may transmit a control signal via a base station communication link 522 to control the working drone 530 in communication with the relay drone 402A. The relay drone 402A may then relay the control signal via the drone directional communication link 534 to the working drone via the drone facing directional antenna 518 (and/or via the omnidirectional antenna via the drone omnidirectional communication link 532 in other embodiments).

As the base station 406A moves, the base station 406A may transmit a control signal via the base station communication link 522 that includes both a base station location signal with a current location of the base station 406 and a command that controls the working drone 530. In response to receiving the control signal, the relay drone 402A may move (as shown by the arrow in FIG. 5B) to the vicinity of the current location of the base station 406A. Also, as the relay drone 402A moves, the relay drone 402A may continuously calibrate the base station facing directional antenna 520 to the current location of the base station 406A (relative to the relay drone's own location determined from the relay drone's GPS unit 514) and also continuously calibrate the drone facing directional antenna 518 to the location for the working drone 530 as determined from the working drone location signal. In certain embodiments, the relay drone 402A may utilize an omnidirectional antenna (not shown) to communicate with the base station 406A over the base station communication link 522.

In certain embodiments, the relay drone 402A may substantially stay above or behind a base station moving with a speed between 0 and 100 kilometers (km) an hour. Advantageously, the relay drone may exchange a high bitrate signal with the base station due at least to maintaining a proximity with the base station 406A and/or maintaining a line of sight with the base station 406A. In certain embodiments, the distance between the relay drone 402A and the working drone 530 can be 1-400 km, usually less than 300 km, while the distance between the relay drone 402A and the base station 406A may be around 500 meters (m). In one embodiment, the relay drone 402A is at a fixed aerial position relative to the base station 406 at more than 300 meters of altitude. In another embodiment, the relay drone 402A may be at a higher altitude or a longer distance from the base station 406 of more than 400 km. These distances may be lateral distance, altitude or any combination thereof.

In certain embodiments, the omnidirectional antenna 516 may detect signals (e.g., location signals) from the working drone 530 via the drone omnidirectional communication link 532. The detection range of the omnidirectional antenna may be about 1000 km, 900 km, 800 km, 700 km, 600 km, 500 km, 400 km, 300 km, 200 km, 100 km, 50 km, 30 km, 10 km, 5 km, 3 km, 1 km, 500 m, 300 m, 100 m, 50 m, or 10 m. The distance may be a lateral distance, altitude or any combination thereof.

In certain embodiments, the directional antenna 518 may receive and send high bitrate and/or broadband signals to and from the working drone 530 through the drone directional communication link 534. The detection range of the directional antenna 518 calibrated to the location of the working drone 530 may be about 1000 km, 900 km, 800 km, 700 km, 600 km, 500 km, 400 km, 300 km, 200 km, 100 km, 50 km, 30 km, 10 km, 5 km, 3 km, 1 km, 500 m, 300 m, 100 m, 50 m, or 10 m. The distance may be lateral distance, altitude or any combination thereof. In certain embodiments, the directional antenna 518 may be configured to rotate or scan for signals across an area. In certain embodiments, the directional antenna may be controlled by the base station 406 via a control signal received via the base station communication link 522.

Drones may change altitude or navigational patterns, such as to compensate for changing environmental fluctuations. These changes in altitude or navigational patterns may be compensated by calibrating directional antennas according to the changes in altitude or navigational patterns and/or moving a drone to follow changes in altitude or navigational patterns. By tracking drone movement during changes in altitude or navigational patterns, a strong signal may be maintained by a communication link over a directional antenna. For example, a working drone may change its altitude by less than or equal to about 1 centimeter (cm), 3 cm, 5 cm, 10 cm, 30 cm, 50 cm, 1 m, 3 m, 5 m, or 10 m within a time period, such as 1 second. Accordingly, a relay drone 402A in communication with the working drone 530, or otherwise tracking the working drone 530, may track the working drone 530 by moving by a same 1 cm, 3 cm, 5 cm, 10 cm, 30 cm, 50 cm, 1 m, 3 m, 5 m, or 10 m within a time period, such as 1 second. Additionally, or in lieu of movement to track the working drone, the relay drone may move a directional antenna to track the movement of the working drone. Furthermore, at least one directional antenna and/or all directional antennas on a drone may be mounted on a gimbal. The gimbal may provide the directional antenna with a stable, unperturbed platform of operation and may have freedom of rotation along any axis in three dimensions.

In certain embodiments, a working drone may be configured to perform various tasks, such as delivering a payload or cargo to a location, video recording activities within a location, or video recording a moving object (such as animals in migration). When the working drone is performing a task that tracks a moving object, the working drone 530 may move to maintain a distance or orientation relative to the moving object.

In certain embodiments, the relay drone 402A may maintain a distance away from a base station 406A, such as by hovering over the base station 406A. The relay drone 402A may hover directly above the base station 406A or, such as in an embodiment with a fixed wing drone, hover by circling around a base station 406A. The distance that a relay drone 402A may maintain from a base station 406A may be less than or equal to about 10 cm, 30 cm, 50 cm, 1 m, 3 m, 5 m, 10 m, 30 m, 50 m, 100 m, 300 m, 500 m, 1 km, 3 km, 5 km, or 10 km. In certain embodiments, a fixed wing drone may be preferable over a multi-copter drone for applications that require a longer operational time or greater distance traveled by the drone.

Figure 6:
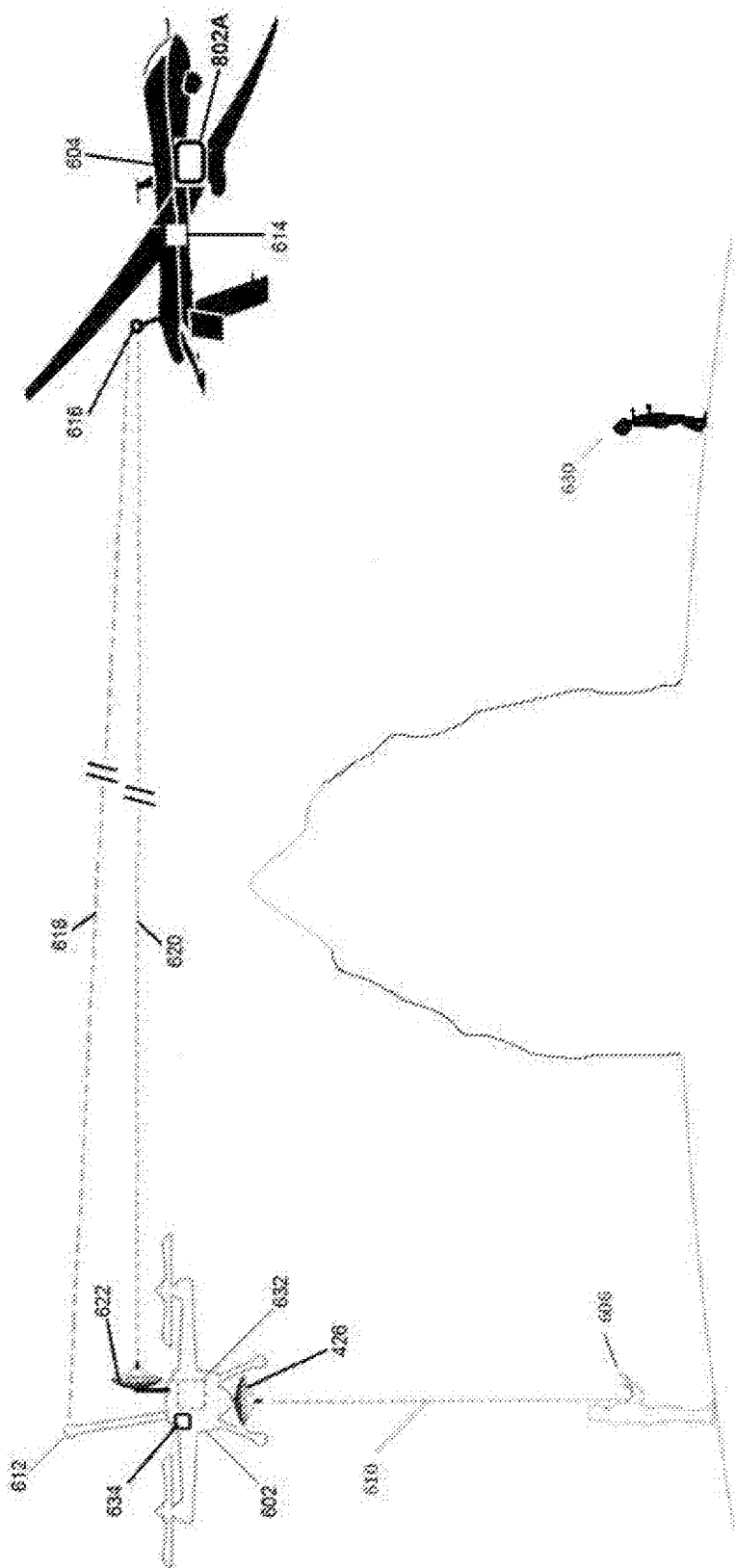
FIG. 6 illustrates an example of a relay drone interacting with a handheld base station.

FIG. 6 illustrates an example of a relay drone 602 interacting with a handheld base station 606. The relay drone 602 may communicate with the handheld base station 606 via a base station communication link 610. The handheld base station may be any type of handheld device capable of communication with the relay drone 602 and may be in a form factor of a tablet computer or a smartphone. In the illustrated embodiment, the base station communication link 610 is wireless. In certain embodiments, the base station communication link 610 may be a WiFi or Bluetooth wireless link or may be established using directional and/or omnidirectional antennas.

The relay drone 602 may be configured to maintain a line of sight with the base station 606. For example, the relay drone 602 may be configured to remain within a set distance from the base station 606, such as within a threshold distance overhead of the base station 606. The relay drone 602 may be configured to receive a working drone location signal from a working drone 604 at the relay drone omnidirectional antenna 612 of the relay drone 602. The working drone location signal may be generated from a GPS unit 614 on the working drone 604 and transmitted from the working drone 604 via a drone omnidirectional communication link 618 from a working drone omnidirectional antenna 616 on the working drone 604 to the omnidirectional antenna 612 on the relay drone 602. In certain embodiments, the omnidirectional antenna (such as the omnidirectional antennas 612, 616 on either the relay drone 602 or the working drone 604 used for transmission or receipt of a location signal for the working drone 604 or the relay drone 602) may be replaced with a directional antenna that performs a sweep of a particular area, such as by rotating across 360 degrees of rotation across one or two axis.

The relay drone 602 may decode the working drone location from the working drone location signal and calibrate a relay drone directional antenna 622 on the relay drone 602 to the working drone location to communicate with the working drone 604 and establish a working drone directional communication link 620. The relay drone directional antenna 622 may be rotatable across a pitch axis while the entire relay drone may be rotatable around a yaw axis. In certain embodiments, the relay drone directional antenna 622 may be rotatable around a horizontal axis while the entire relay drone 602 may be rotatable around a vertical axis. The relay drone 602 may include a compass 632 and an inertial navigation system (INS) 634. The INS 634 may include motion and rotation sensors. The motion sensors may be accelerometers and the rotation sensors may be gyroscopes.

In certain embodiments, the distance between the relay drone 602 and the working drone 604 can be 1-400 km, usually less than 300 km, while the distance between the relay drone 602 and the base station 606 may be around 500 meters. In one embodiment, the relay drone 602 is at a fixed aerial position above the base station 606 at more than 300 meters of altitude. In another embodiment, the relay drone 602 may be at a higher altitude or a longer distance from the base station 606, for example of more than 400 km. These distances may be lateral distance, altitude or any combination thereof.

The working drone 604 may be configured for various tasks as dictated by the base station 606. For example, the working drone may be tasked with delivering cargo to a location of a target 630 or to monitor the target 630 by recording sensory data (e.g., video data) from the target 630. The cargo may be stored external to the chassis of the working drone 604 or may be stored internally within the working drone 604.

Figure 7:
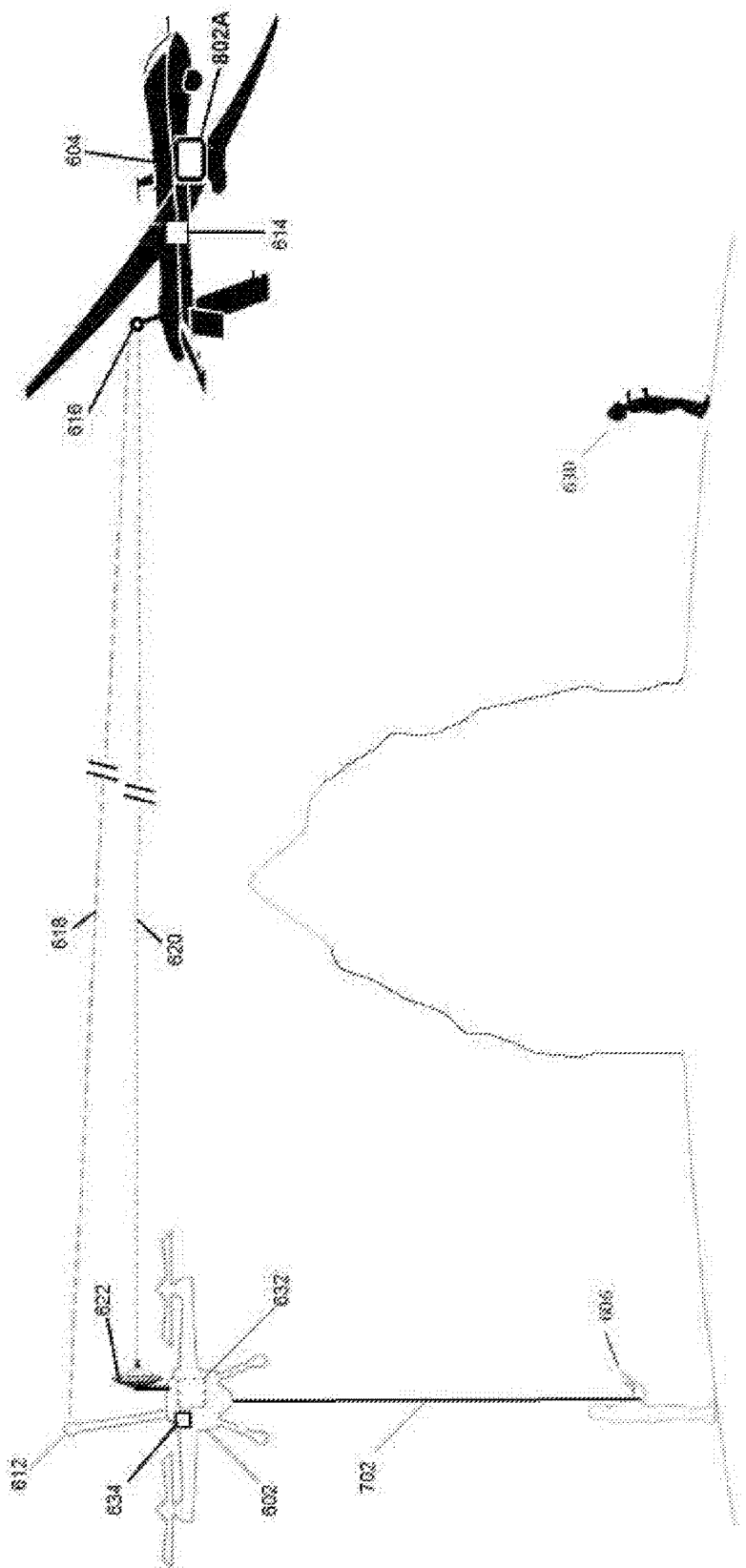
FIG. 7 illustrates an example of a relay drone tethered to a base station.

FIG. 7 illustrates an example of the relay drone of FIG. 6 with a physical line that tethers the relay drone 602 to the base station 606. FIG. 7 is the same as FIG. 6 except that the base station communication link 610 of FIG. 6 is a wired base station communication link 702 in FIG. 7. The wired base station communication link 702 may be a physical connection, such as a cable. In certain embodiments, the wired base station communication link 702 may also supply power to the relay drone 602. In certain embodiments, the wired base station communication link 702 may be used in lieu of any wireless communication between the base station 606 and the relay drone 602.

In certain embodiments, the relay drone may not move due to self propulsion but may rely upon air friction to be propelled, such as in the form of a glider or kite pulled by a base station.

Figure 8:
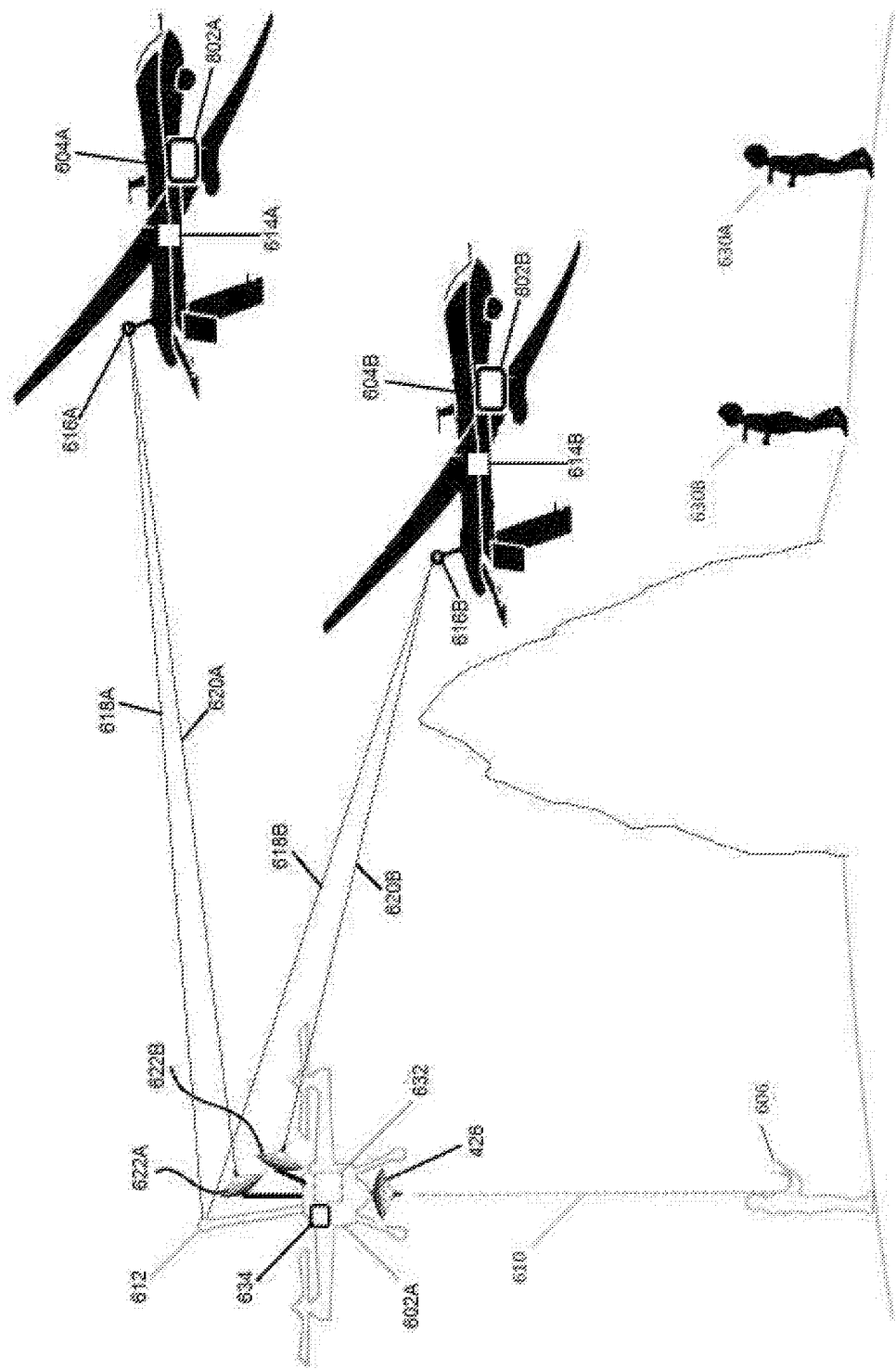
FIG. 8 illustrates an example of a relay drone interacting with multiple working drones.

FIG. 8 illustrates an example of a relay drone 602A interacting with multiple working drones 604A, 604B. The relay drone 602 of FIGS. 6 and 7 is the same as the relay drone 602A of FIG. 8 except that the relay drone 602A includes multiple relay drone directional antennas 622A, 622B. The relay drone 602A is configured to receive working drone location signals from different drone omnidirectional communication links 618A, 618B from multiple working drones 604A, 604B. The relay drone 602A is also configured to calibrate different relay drone directional antennas 622A, 622B, to establish multiple relay drone directional communication links 620A, 620B for each working drone 604A, 604B.

Each working drone location signal may be generated from a GPS unit 614A, 614B on each working drone 604A, 604B and transmitted from each working drone 604A, 604B via the drone omnidirectional communication link 618A, 618B from each working drone omnidirectional antenna 616A, 616B on the working drones 604A, 604B. Also, each working drone 604A, 604B may be configured for various tasks as dictated by the base station 606. For example, each working drone 604A, 604B may be tasked with delivering cargo 802A, 802B deployable from each working drone 604A, 604B to a location of different targets 630A, 630B or to monitor different targets 630A, 630B by recording sensory data (e.g., video data) of each target 630A, 630B. In the illustrated embodiment of FIG. 8, the cargo 802A, 802B is external to the chassis of each working drone 604A, 604B. In certain embodiments, the working drones 604A, 604B may also retrieve (e.g., pick up) cargo from the targets' 630A, 630B vicinities for delivery to the vicinity of the base station 606.

Accordingly, the base station 606 may send a control signal to a single relay drone 602A for control of multiple working drones 604A, 604B and/or receive data signals from multiple working drones 604A, 604B via the single relay drone 602A.

Figure 9:
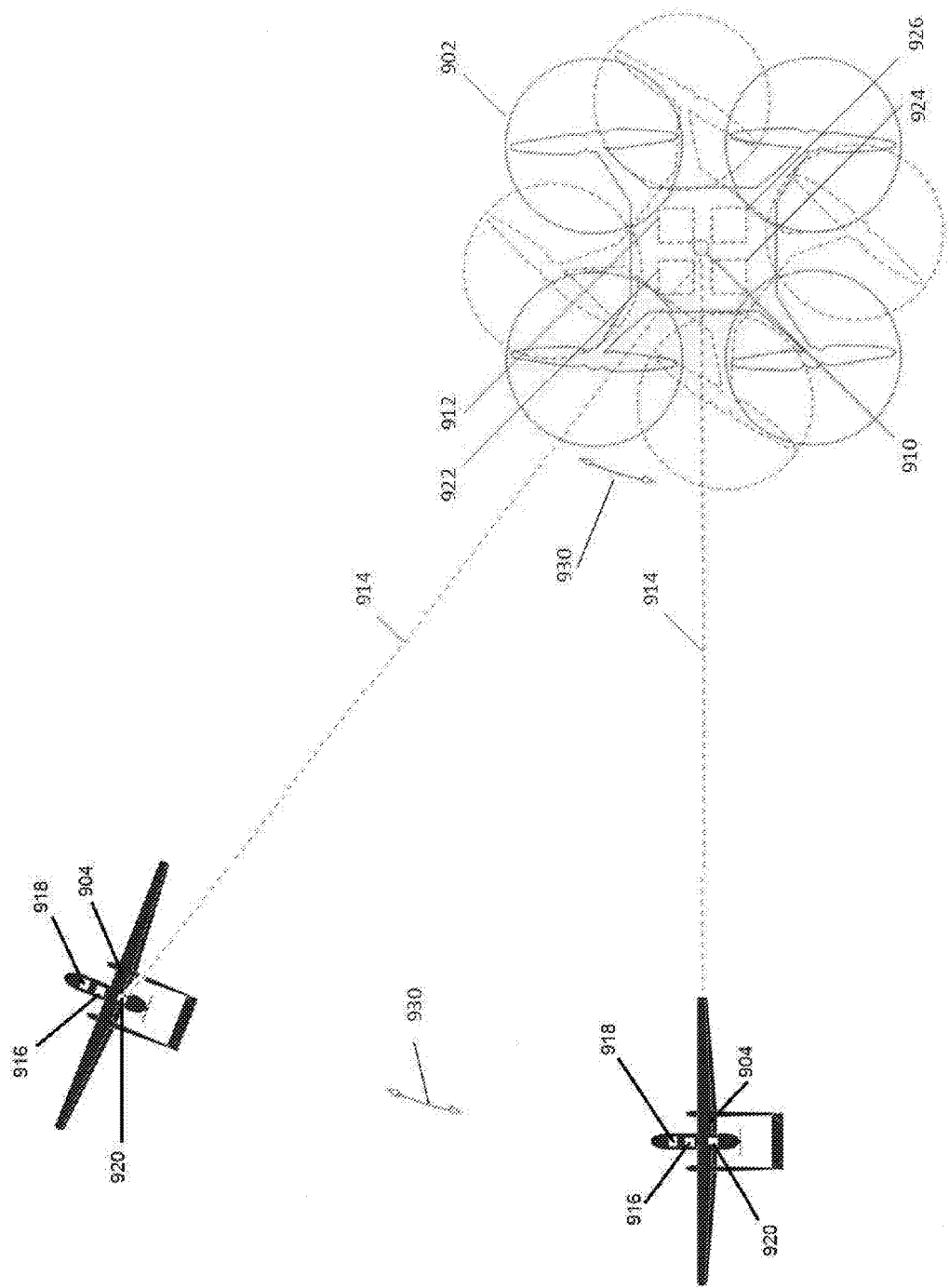
FIG. 9 illustrates an example of a relay drone tracking a working drone along a yaw axis.

FIG. 9 illustrates an example of a relay drone 902 tracking a working drone 904 along a yaw axis from a top view. The movement of the relay drone 902 along the yaw axis is illustrated with the subsequent orientation of the relay drone 902 illustrated with a dashed line silhouette.

The working drone 904 may include a processor 916, a location unit 918 (such as a GPS and/or altimeter or barometer) and an omnidirectional antenna 920. The location unit 918 may generate location information noting a current location of the working drone 904. The processor may encode the location information and send the location information as a location signal from the working drone 904 using the omnidirectional antenna 920 via the drone omnidirectional communication link 914. The location information may be updated as the working drone 904 moves and updated location information may be sent from the working drone 904 for updated locations of the working drone 904 as the working drone 904 moves by changing locations over time.

The relay drone 902 may include a processor 912, location unit 922, compass 924, INS 926 and relay drone omnidirectional antenna 910. The relay drone omnidirectional antenna 910 may receive the location information from the working drone 904 via the drone omnidirectional communication link 914. The processor 912 on the relay drone 902 may be configured to calculate a position of the working drone 904 based on the received working drone location signal. The processor 921 may also be configured to calculate a difference between the current orientation of the relay drone 902 and a possible orientation of the relay drone that tracks the movement of the working drone 904. The processor 912 on the relay drone may then configure the relay drone 902 to rotate around the yaw axis to track the movement of the working drone along the yaw axis in accordance with the possible orientation of the relay drone 902. The processor may utilize information generated by the location unit 922, compass 924 and INS 926 to configure the relay drone to rotate around the yaw axis. For example, the compass 924, such as a triaxial digital magnetometer, and/or INS 926 may provide an approximate position and orientation of the relay drone 902 using a triaxial gyroscope and a triaxial accelerometer. The INS 926 provided approximate position and orientation may be compared with the absolute position and orientation provided by the location unit 922 and used by the process to execute a control sequence for relay drone 902 movement. The rotation around the yaw axis is noted with double headed arrows 930. As the working drone sends updated location information to reflect the movement of the working drone, the relay drone may receive the updated location information and further rotate along the yaw axis to track the movement of the working drone. In certain embodiments, the relay drone 902 may have multiple directional antennas (such as those shown in FIG. 8) to establish a drone directional communication link with multiple working drones.

Figure 10:
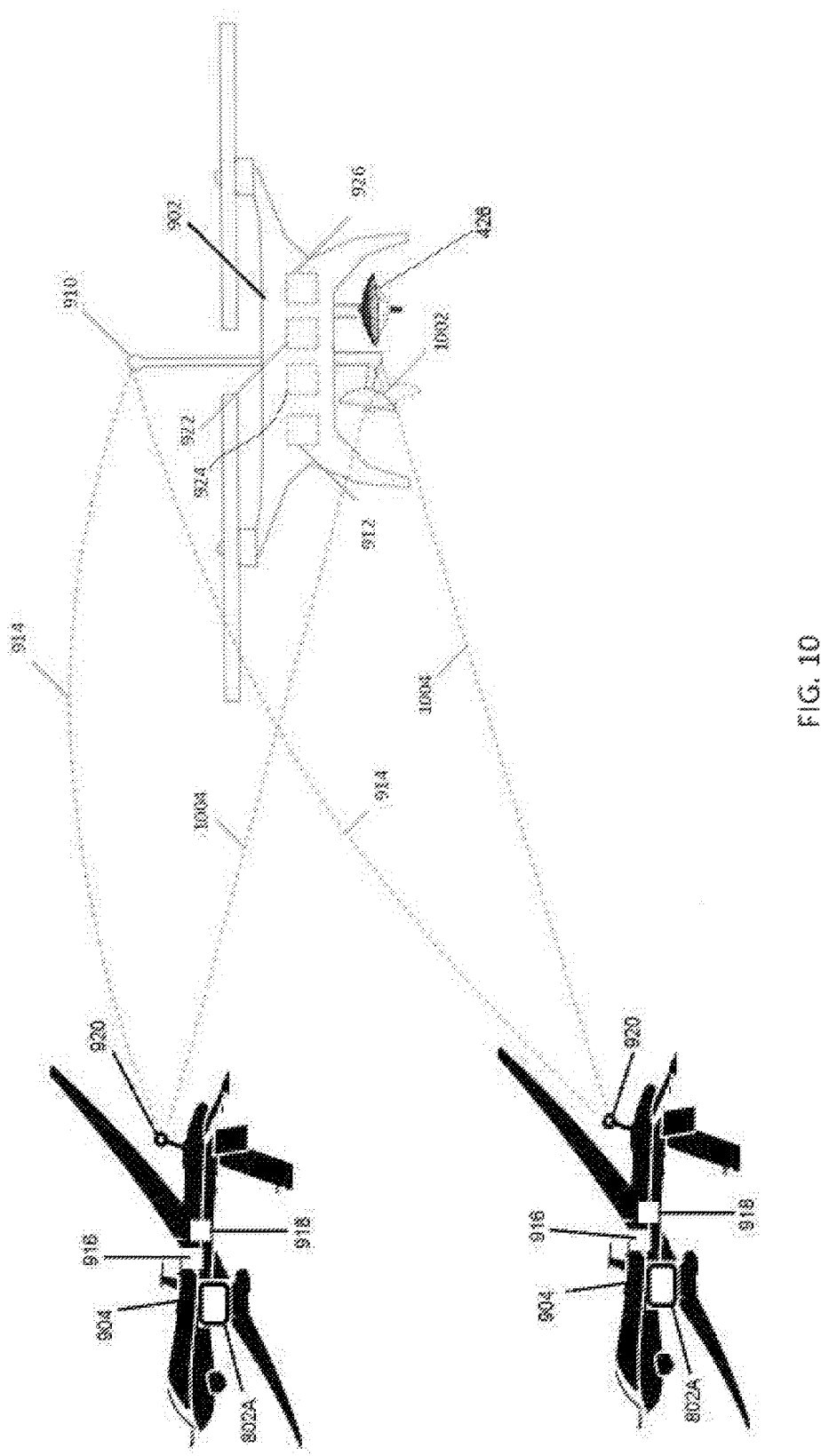
FIG. 10 illustrates an example of a relay drone tracking a working drone along a pitch axis.

FIG. 10 illustrates an example of the relay drone 902 tracking the working drone 904 along a pitch axis from a side view. The movement of the relay drone 902 and the relay drone directional antenna 1002 along the pitch axis is illustrated a dashed line silhouette.

As the working drone 904 changes elevation, or otherwise moves along the relay drone's 902 pitch axis, the relay drone directional antenna 1002 on the relay drone 902 tracking the working drone 904 may be moved (e.g., tilted) along the pitch axis of the relay drone 902. This movement of the relay drone directional antenna 1002 may be performed to maintain a drone directional communication link 1004 without movement of other parts of the relay drone 902. The movement of the relay drone directional antenna 1002 may be performed by controlling a shaft on which the relay drone directional antenna 1002 is mounted. The shaft control may be performed by a PID (proportional-integral-derivative) controller. In certain embodiments, the directional antenna may also be mounted on a series of shafts (such as a ceramic shaft of a machinable ceramic with resistance to weather and thermal changes) with a stepper motor. The motor may be a piezoelectric motor with an optical encoder.

Alternatively or additionally, the directional antenna 1002 can be stabilized on a gimbal, such as a 1-axis gimbal, 2-axis gimbal, or 3-axis gimbal.

In certain embodiments, the working drone 904 may be 300 km away from the relay drone 902. The relay drone 902 may also be at least 500 meters in altitude to achieve a line of sight with the working drone 904. In certain embodiments, the relay drone 902 and/or the working drone 904 may be a long distance drone having fixed wings capable of continuous operation for 6-10 hours.

Figure 11:
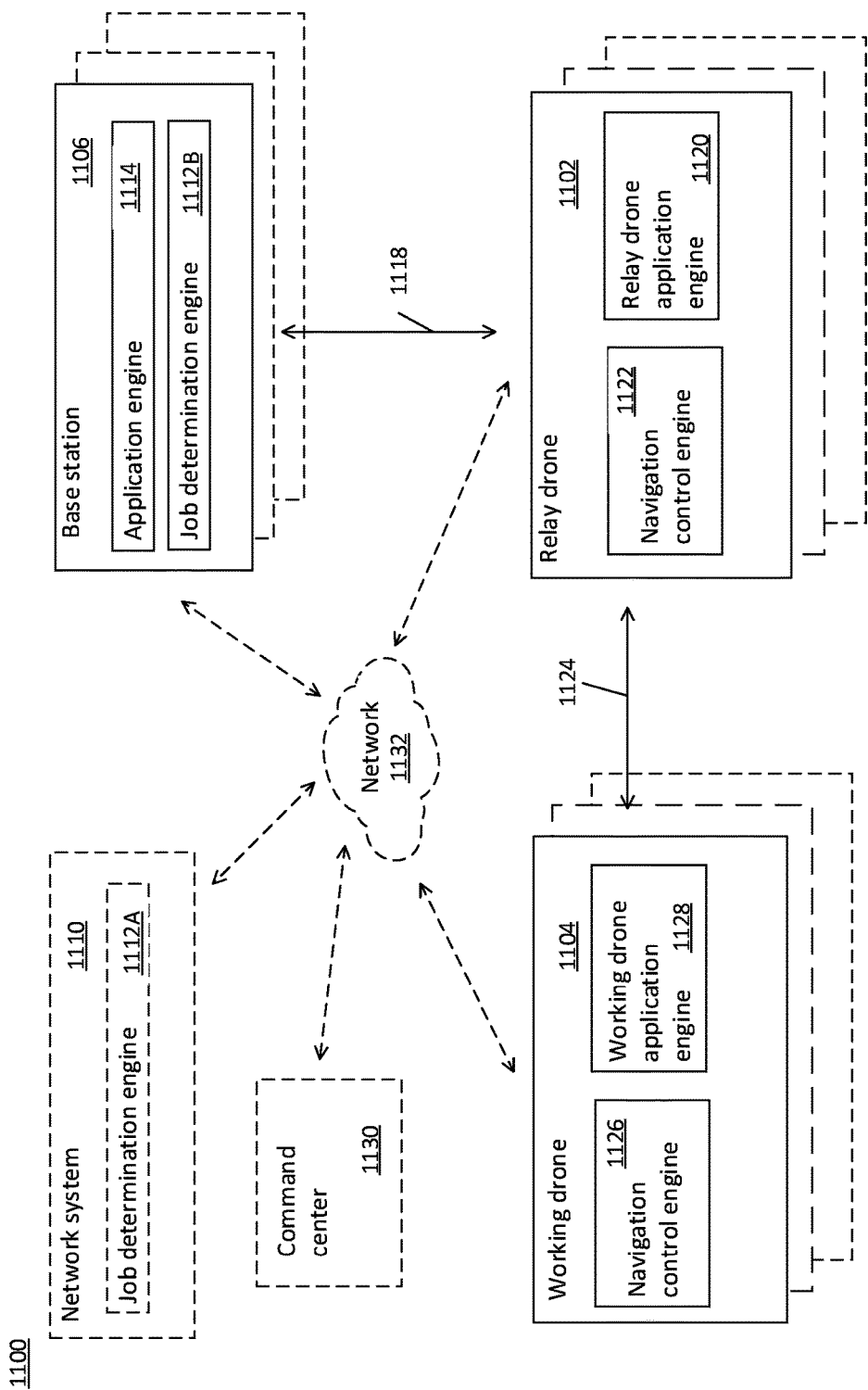
FIG. 11 is a block diagram of example systems utilized in a relay drone system.

FIG. 11 is a block diagram 1100 of example systems utilized in a relay drone system. The block diagram 1100 includes at least one base station 1106 in communication with at least one relay drone 1102 and at least one working drone 1104. The system of the base stations 1106, relay drones 1102 and working drones 1104 may be termed as a relay drone network. Optionally, the nodes of the relay drone network may interact externally with a network system 1110 and command center 1130 over a network 1132, such as the Internet, LTE, cellular network, or any known communication network. In the illustrated embodiment of FIG. 11, each of the base station 1106, relay drone 1102, and working drone 1104 are illustrated with receding boxes to note that there may be multiple base stations 1106, relay drones 1102, and/or working drones 1104 networked and operating together.

One contemplated example of a command center 1130 is a police headquarter stationarily located in a distant city. Typically the police headquarter would not be able to directly communicate in real time with the working drone 1104 and/or the relay drone 1102. Through the contemplated embodiments described herein, the police headquarter may now receive and sent data, including commands, to the working drone 1104 and/or the relay drone 1102 in real time.

The relay drone 1102 can be in communication with at least one working drone 1104, at least one base station 1106, and/or with other relay drones 1102. Additionally, the relay drone 1102 and/or the working drone 1104 can be optionally in communication with the network system 1110 or the command center 1130 (e.g., over a network 1132, such as the Internet, LTE, cellular network, any known communication network, or through an intermediate system). The network system 1110, command center 1130 and/or the base station 1106 can determine working drone control information, encoded in a working drone control signal, describing one or more tasks for performance by the working drone 1104 (such as payload delivery). The network system 1110, command center 1130 and/or the base station 1106 can also determine relay drone control information, encoded in a relay drone control signal, describing one or more tasks (such as a navigational pattern) for performance by the relay drone 1102.

The network system 1110 and/or the base station 1106 can include a job determination engine 1112A, 1112B that can receive, or obtain, information describing jobs or tasks, and determine task information. In certain embodiments, the job determination engine may include a repository, such as a data store, that includes various jobs or tasks that may be performed by a relay drone 1102 or a working drone 1104, along with associated metadata for the jobs or tasks.

The job determination engine 1112A, 1112B can communicate with the application engine to generate interactive user interfaces (e.g., web pages to be rendered by a base station) for presentation on a base station (e.g., on user interface of the base station). Via the user interface, a user of the base station can assign tasks to the relay drone 1102 and/or working drone 1104 and provide information, such as parameters, associated with the task.

In certain embodiments, a base station 1106 does not communicate with the network system 1110 and utilizes a job determination engine 1112B locally rather than a remote job determination engine 1112A hosted on the network system for generation of a control signal.

For instance, a user, via the user interface of the application engine at the base station 1106 can assign a task to a working drone 1104 relative to a specific property or location. The user may also include information or parameters for performance of the task, such as property boundaries of the location for payload or cargo deliver (or reference a database or system that stores or can access the property boundary information), geo-rectified imagery (e.g., satellite imagery) of the location, and so on.

The application engine 1114 can process the job information and generate control signals that may be sent to the relay drone as commands that effectuate tasks for the relay drone 1102 and/or working drone 1104. For instance, the control signal may encode control information that specifies which working drone 1104 to perform a task or which relay drone 1102 is to relay a control signal to a working drone 1104. The control information may also include a navigational path for the relay drone 1102 and/or working drone 1104. For example, the control information can command the working drone 1104 is to navigate according to a zig-zag pattern based on a safe altitude selected at the base station 1106. This may be based on the particular focal length, sensor resolution, and so on, of a camera included in the working drone 1104, such that the distance between each leg of the zig-zag pattern is to be a particular distance apart so that there will not be holes in the camera's coverage of a target location.

The relay drone 1102 can receive the control signal from the base station 1106 via a base station communication link 1118, discussed further above. This base station communication link 1118 may be over a wireless or a wired connection, and may be effectuated using all directional antennas, all omnidirectional antennas, or a combination of omnidirectional and directional antennas. The control signal may include relay drone control information 1102 that controls an aspect of the relay drone 1102 or commissions the relay drone 1102 to perform a task, such as to remain within a distance and/or a line of sight of the base station 1106.

The relay drone 1102 may include a relay drone application engine 1120 that can configure the relay drone to execute the task identifiable from the relay drone control signal. In executing the task, the relay drone 1102 can ascend to the safe altitude (e.g., identified in the relay drone control information), and maintain a location relative to the base station 1106. The relay drone control signal may also include a working drone control signal, where the relay drone 1102 can be configured to pass the working drone control information to the working drone 1104 via a working drone communication link 1124 (which can include a drone omnidirectional communication link and a drone directional communication link, as introduced above).

The relay drone 1102 can include a navigation control engine 1112 that can manage the propulsion mechanisms (e.g., motors, rotors, propellers, and so on) included in the relay drone 1102 to effect the task identified in the relay drone control information. Optionally, the relay drone application engine 102 can provide commands (e.g., high level commands) to the navigation control engine 1112, which can interpret or override the relay drone control information from the relay drone control signal. For instance, the relay drone application engine 1120 can indicate that the relay drone 1102 is to descend at a location due to the relay drone 1102 being damaged, and the navigation control engine 1122 can ensure that the relay drone 1102 descends in a substantially vertical direction.

The working drone 1102 may include a working drone application engine 1120 that can configure the working drone to execute the task identified in the working drone control information received via working drone communication link 1124. In executing the task, the relay drone 1102 can ascend to the safe altitude (e.g., identified in the working drone control information), maintain a location relative to the relay drone 1102, and activate a payload (e.g., sensors included in the working drone 1104 to obtain real-world information describing a target area).

The working drone 1104 can include a navigation control engine 1126 that can manage the propulsion mechanisms (e.g., motors, rotors, propellers, and so on) included in the working drone 1126 to effect the task identified in the working drone control information. Optionally, the working drone application engine 1128 can provide commands (e.g., high level commands) to the navigation control engine 1126, which can interpret or override the working drone control information. For instance, the working drone application engine 1128 can indicate that the working drone 1126 is to descend at a location due to the working drone 1104 being damaged, and the navigation control engine 1126 can ensure that the working drone 1104 descends in a substantially vertical direction.

After executing, or as part of, executing the task detailed in the working drone control information, the working drone 1104 can send a data signal to be relayed to the base station 1106 by the relay drone 1102. This process may be iterative, such as where the base station 1106 sends additional working drone control information to the working drone 1104, relayed via the relay drone 1104, after receiving the data signal. For example, the working drone 1104 can provide sensor information for the base station 1106. The base station 1106 can combine the received sensor information (e.g., stitch together images, generate a 3D model of the property, and so on). Based on the combined received sensor information, the base station can send updated working drone control information to the working drone 1104, via the relay drone 1102, for more detailed inspection of an area identified in the sensor information.

Optionally, the working drone 1104 and/or the relay drone 1102 may be in communication with a command center 1130 over the network 1132. The command center 1130 may directly send working drone control information to a working drone and/or relay drone or relay drone control information to a relay drone that overrides control information sent from a base station 1106.

Figure 12:
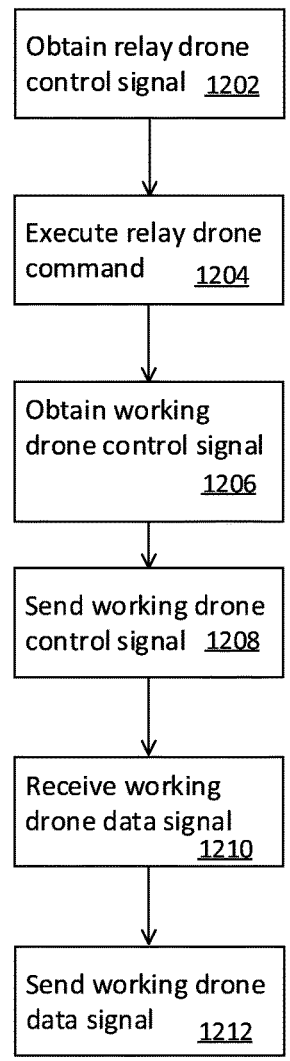
FIG. 12 is a flowchart of an example process for relay drone operation.

FIG. 12 is a flowchart of an example process 1200 for relay drone operation. The process 1200 may be performed by a relay drone, which may utilize one or more computers or processors.

The relay drone may obtain a relay drone control signal (block 1202) from a base station. The relay drone control signal may be received via a base station communication link with the base station.

The relay drone may execute the command from the relay drone control signal (block 1204). As described above, the relay drone control signal may control the relay drone to perform a task. For example, the relay drone control signal may instruct the relay drone to perform a navigational task such as to remain within a certain distance of the base station, remain within a path with a line of sight of a base station or assume a holding pattern around a base station. In certain embodiments, the relay drone control signal may instruct the relay drone to remain within a distance of the base station and within the line of sight of the base station, even as the base station is in motion.

The relay drone may obtain a working drone control signal (block 1206). The working drone control signal may include a designation of a working drone for the working drone control signal to be passed to. The working drone control signal may include a command for the working drone and/or instruct the working drone to perform a task.

The relay drone may relay the working drone control signal for the working drone (block 1208). The working drone control signal may also include a command to the relay drone to relay the working drone control signal to the appropriate working drone (e.g., by setting parameters for the relay such as a time for when the working drone control signal is to be relayed). In certain embodiments, the relay drone may automatically relay the working drone control signal to the appropriate working drone in response to receiving the working drone control signal without requiring an additional component in the working drone control signal addressed to the relay drone. The relay drone may transmit the working drone control signal directly to the working drone via a working drone communication link established between the working drone and the relay drone.

In certain embodiments, the relay drone may indirectly transmit the working drone control signal to the working drone via at least one other relay drone. In this situation, the relay drone may send the working drone control signal to the other relay drone via a relay drone communication link between relay drones.

The relay drone may receive a working drone data signal generated by a working drone (block 1210). The working drone data signal may be generated by the working drone in response to receiving the working drone control signal. The working drone data signal may include data and/or feedback from the working drone for a designated base station. The working drone data signal may be received via a working drone communication link if the relay drone is in direct communication with the working drone, or may be received via a drone communication link if the relay drone is in indirect communication with the working drone through another relay drone.

The relay drone may send the working drone data signal (block 1212). The working drone data signal may include a command to the relay drone to relay the working drone data signal to the appropriate base station (e.g., by setting parameters for the relay such as a time for when the working drone data signal is to be relayed). In certain embodiments, the relay drone may automatically relay the working drone data signal to the appropriate base station in response to receiving the working drone data signal without requiring an additional component in the data signal addressed to the relay drone. If the relay drone is in direct communication with the base station, the relay drone may transmit the working drone data signal directly to the base station via a base station communication link established between the working drone and the base station.

In certain embodiments, the relay drone may indirectly transmit the working drone data signal to the base station via at least one other relay drone. In this situation, the relay drone may send the working drone data signal to the other relay drone via a relay drone communication link between relay drones for transmission to the base station.

Figure 13:
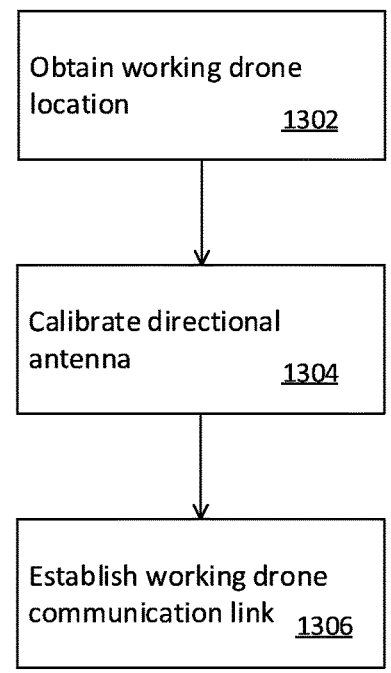
FIG. 13 is a flowchart of an example process for establishing a working drone communication link.

FIG. 13 is a flowchart of an example process for establishing a working drone communication link. The process 1300 may be performed by a relay drone, which may utilize one or more computers or processors.

The relay drone may obtain a working drone location (block 1202) from a working drone. The working drone location may be a location of a working drone and/or a location of a working drone's antenna from which the working drone communication link may be established. The working drone location may be transmitted at a particular time or periodically from a working drone. Accordingly, the working drone location may be updated periodically to reflect how a base station remains in a same place over time or moves over time. The working drone location may be transmitted via a working drone omnidirectional antenna or via a working drone directional antenna, such as via a working drone directional antenna directed to the location of the relay drone or a working drone directional antenna in a sweeping motion that spans a wide area that happens to include the relay drone.

The relay drone may calibrate a relay drone directional antenna on the relay drone to the working drone location (block 1302). The relay drone may designate a relay drone directional antenna to a single working drone or may share a relay drone directional antenna among many working drones (such as by performing time or code based multiplexing).

The relay drone may establish a working drone communication link with the working drone (block 1306).

The working drone communication link may be established with the working drone by first initializing a communication handshake with the working drone for the working drone to initialize, or accept, communication with the relay drone. After the handshake, the relay drone may communicate with the working drone via the directional antenna of the relay drone. The communication may occur by having the relay drone transmit data or signals to and/or receive data or signals from the working drone using the directional antenna of the relay drone. The data or signals transferred may include a working drone control signal and/or a working drone data signal.

In certain embodiments, the handshake includes transmitting a relay drone location to the working drone and having a directional antenna at the working drone calibrate to point at the relay drone location. After the handshake, the working drone communication link may be established by communicating with the relay drone via a directional antenna of the relay drone.

Figure 14:
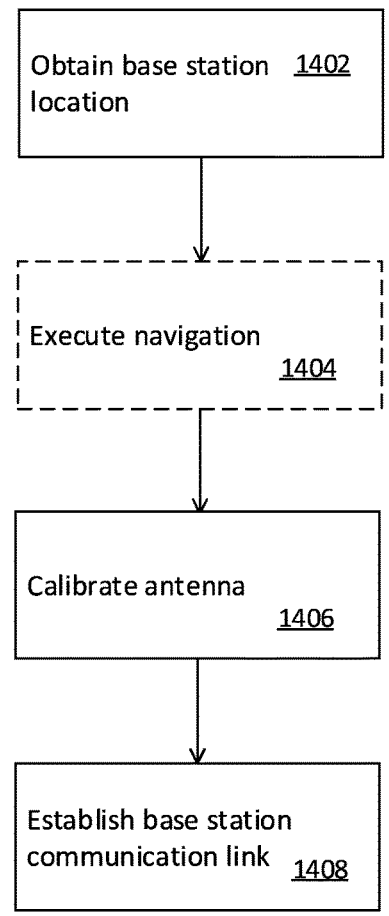
FIG. 14 is a flowchart of an example process for establishing a base station communication link.

FIG. 14 is a flowchart of an example process for establishing a base station communication link. The process 1400 may be performed by a relay drone, which may utilize one or more computers or processors.

The relay drone may obtain a base station location (block 1402). The base station location may be obtained from the base station, obtained via sensors accessible to the relay drone or may be predetermined and stored in a data store accessible to the relay drone. The base station location may be a location of a base station and/or a location of a base station's antenna from which the base station communication link may be established. The base station location may be determined or updated periodically, such as by refreshing sensors accessible to the relay drone or transmitted periodically from the base station. Accordingly, the base station location may be updated periodically to reflect how a base station remains in a same place over time or moves over time.

When received and not sensed, the base station location may be received wirelessly via an omnidirectional antenna or a directional antenna on the relay drone, such as via a relay drone directional antenna directed to the location of the base station or a relay drone directional antenna in a sweeping motion that spans a wide area that happens to include the base station.

The base station location may be sent wirelessly from the base station via an omnidirectional antenna or a directional antenna on the base station, such as via a base station directional antenna directed to the location of the relay drone or a base station directional antenna in a sweeping motion that spans a wide area that happens to include the relay drone.

In certain embodiments, the base station location may be received over a physical wire connected with the base station. The base station location may be encoded as part of a relay drone control signal received at the relay drone from the base station.

Optionally, as indicated with dotted lines, the relay drone may execute a navigational protocol in response to receiving a base station location (block 1404). For example, based upon the base station location, the relay drone may execute a navigational protocol that causes the relay drone to remain within a vicinity of the base station or to move along a path with a direct line of sight with the base station. In certain embodiments, the relay drone may have received a control signal from the base station that configures the relay drone to (or be preprogramed without first receiving the control signal to) remain within a vicinity of the base station or to move along a path with a direct line of sight with the base station The relay drone may calibrate an antenna on the relay drone to communicate with the base station (block 1406). The antenna may be calibrated by adopting a communication protocol specific for communicating with the base station, such as by adopting a specific data encoding protocol for communication with the base station and/or by calibrating a directional antenna facing the base station to point directly at the base station location. In certain embodiments, the relay drone may designate a directional antenna to a single base station or may share a directional antenna among many base stations (such as by performing time or code based multiplexing).

The relay drone may establish a base station communication link with the base station (block 1408). The relay drone communication link may be established with the base station by initializing a communication handshake with the base station for the base station to initialize, or accept, communication with the relay drone. After the handshake, the relay drone may communicate with the base station via the communication protocol specific for communicating with the base station. The communication may occur by having the relay drone transmit data or signals to and/or receive data or signals from the base station using the directional antenna of the relay drone. The data or signals transferred may include a relay drone control signal and/or a working drone data signal.

In certain embodiments, the handshake includes transmitting a relay drone location to the base station for a directional antenna at the base station to calibrate to and point at the relay drone location. After the handshake, the base station communication link may be established by communicating with the relay drone via a directional antenna of the base station.

Figure 15:
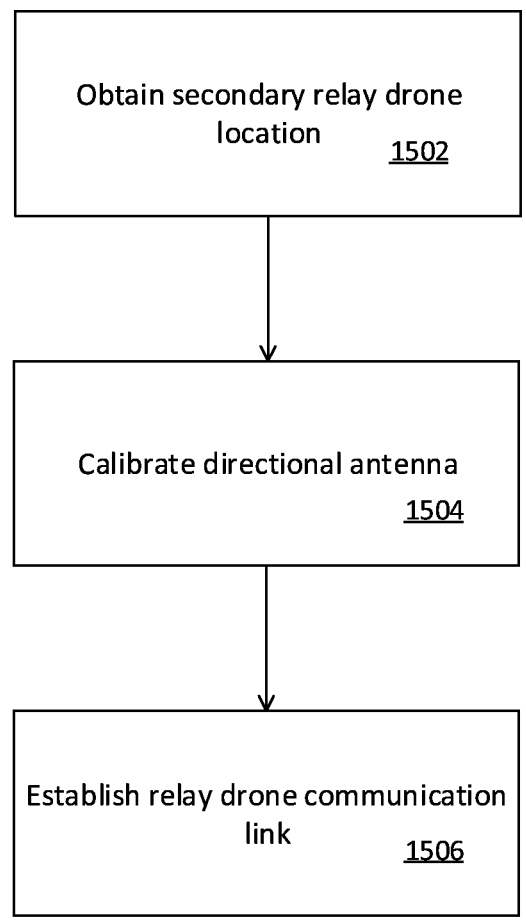
FIG. 15 is a flowchart of an example process for establishing a relay drone communication link.

FIG. 15 is a flowchart of an example process for establishing a relay drone communication link. The process 1500 may be performed by a relay drone, which may utilize one or more computers or processors.

The relay drone may obtain a secondary relay drone location (block 1502) for a secondary relay drone. The secondary relay drone is a remote relay drone that the relay drone is configured to establish communication with. The secondary relay drone location may be a location of the secondary relay drone and/or a location of the secondary relay drone's antenna from which the relay drone communication link may be established. The secondary relay drone location may be sensed via sensors accessible to the relay drone and/or transmitted at a particular time or periodically from the secondary relay drone. Alternatively, the secondary relay drone location may be transmitted from a base station or from any source accessible to the relay drone over a network. In certain embodiments, the secondary relay drone location may be encoded as part of a relay drone control signal received from the base station.

The secondary relay drone location may be received wirelessly via an omnidirectional antenna or a directional antenna on the relay drone, such as via a relay drone directional antenna directed to the location of the secondary relay drone or a relay drone directional antenna in a sweeping motion that spans an area that includes the secondary relay drone.

The secondary relay drone location may be sent wirelessly from the secondary relay drone via an omnidirectional antenna or a directional antenna on the secondary relay drone, such as via a secondary relay drone directional antenna directed to the location of the relay drone or a secondary relay drone directional antenna in a sweeping motion that spans an area that includes the relay drone.

The relay drone may calibrate a directional antenna on the relay drone to the secondary relay drone location (block 1504). The relay drone may designate a directional antenna on the relay drone to a single secondary relay drone or may share a directional antenna on the relay drone among many secondary relay drones (such as by performing time or code based multiplexing).

The relay drone may establish a relay drone communication link with the secondary relay drone (block 1408). In establishing the relay drone communication link with the secondary relay drone, the relay drone may initialize a communication handshake with the secondary relay drone for the secondary relay drone to initialize, or accept, communication protocol with the relay drone. After the handshake, the relay drone may communicate with the secondary relay drone via a communication protocol specific for communicating with the secondary relay drone. The communication protocol may include having the relay drone transmit data or signals to and/or receive data or signals from the secondary relay drone using the directional antenna of the relay drone (and, optionally, the directional antenna of the secondary relay drone on the other end of the communication link). The communication protocol for the secondary relay drone to communicate with the relay drone may include transmitting a relay drone location to the secondary relay drone and having the secondary relay drone calibrate a directional antenna at the secondary relay drone to the relay drone location. The data or signals transferred may include a relay drone control signal, working drone control signal and/or a working drone data signal.

Figure 16:
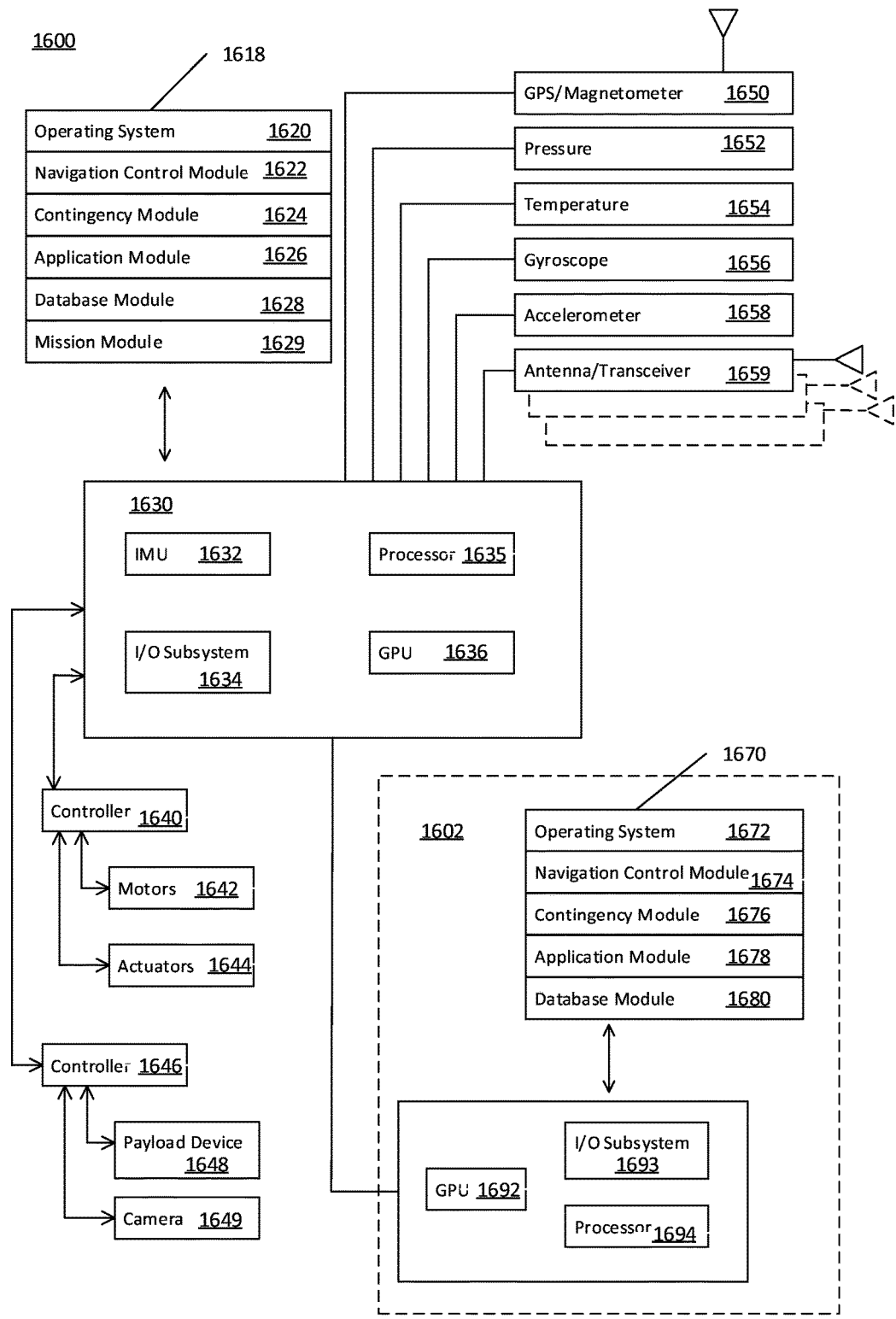
FIG. 16 illustrates a block diagram of an example system architecture for a drone.

FIG. 16 illustrates a block diagram of an example system architecture for a drone for implementing the features and processes described herein. The drone may be a relay drone or a working drone.

A drone primary processing system 1600 can be a system of one or more computers, or software executing on a system of one or more computers, which is in communication with, or maintains, one or more databases. The drone primary processing system 1600 can be a system of one or more processors 1635, graphics processors 1636, I/O subsystem 1634, logic circuits, analog circuits, associated volatile and/or non-volatile memory, associated input/output data ports, power ports, etc., and/or one or more software processing executing one or more processors or computers. The autopilot system 1630 includes the inertial measurement unit (IMU) 1632, processor 1635, I/O subsystem 1634, GPU 1636, and various operating system 1620, and modules 1620-1629. Memory 1618 may include non-volatile memory, such as one or more magnetic disk storage devices, solid state hard drives, or flash memory. Other volatile memory such a RAM, DRAM, SRAM may be used for temporary storage of data while the drone is operational. Databases may store information describing drone navigational operations, navigation plans, contingency events, geofence information, component information, and other information.

The drone processing system may be coupled to one or more sensors, such as GNSS receivers 1650 (e.g., a GPS, GLONASS, Galileo, or Beidou system), gyroscopes 1656, accelerometers 1658, temperature sensors 1654 pressure sensors (static or differential) 1652, current sensors, voltage sensors, magnetometer, hydrometer, and motor sensors. The drone may use an inertial measurement unit (IMU) 1632 for use in navigation of the drone. Sensors can be coupled to the processing system, or to controller boards coupled to the drone processing system. One or more communication buses, such as a CAN bus, or signal lines, may couple the various sensor and components.

Various sensors, devices, firmware and other systems may be interconnected to support multiple functions and operations of the drone. For example, the drone primary processing system 1600 may use various sensors to determine the vehicle's current geo-spatial location, attitude, altitude, velocity, direction, pitch, roll, yaw and/or airspeed and to pilot the vehicle along a specified route and/or to a specified location and/or to control the vehicle's attitude, velocity, altitude, and/or airspeed (optionally even when not navigating the vehicle along a specific path or to a specific location).

The navigation control module (also referred to as navigation control engine) 1622 handles navigation control operations of the drone. The module interacts with one or more controllers 1640 that control operation of motors 1642 and/or actuators 1644. For example, the motors may be used for rotation of propellers, and the actuators may be used for navigation surface control such as ailerons, rudders, flaps, landing gear, and parachute deployment.

The contingency module 1624 monitors and handles contingency events. For example, the contingency module may detect that the drone has crossed a border of a geofence, and then instruct the navigation control module to return to a predetermined landing location. Other contingency criteria may be the detection of a low battery or fuel state, or malfunctioning of an onboard sensor, motor, or a deviation from the navigation plan. The foregoing is not meant to be limiting, as other contingency events may be detected. In some instances, if equipped on the drone, a parachute may be deployed if the motors or actuators fail.

The mission module 1629 processes the navigation plan, waypoints, and other associated information with the navigation plan. The mission module 1629 works in conjunction with the navigation control module. For example, the mission module may send information concerning the navigation plan to the navigation control module, for example lat/long waypoints, altitude, navigation velocity, so that the navigation control module can autopilot the drone.

The drone may have various devices connected to it for data collection. For example, photographic camera 1649, video cameras, infra-red camera, multispectral camera, and Lidar, radio transceiver, sonar, TCAS (traffic collision avoidance system). Data collected by the devices may be stored on the device collecting the data, or the data may be stored on non-volatile memory 1618 of the drone processing system 1600.

The drone processing system 1600 may be coupled to various antennas, radios, and transmitters 1659 for manual control of the drone, and for wireless or wired data transmission to and from the drone primary processing system 1600, and optionally the drone secondary processing system 1602. The drone may use one or more communications subsystems, such as a wireless communication or wired subsystem, to facilitate communication to and from the drone. Wireless communication subsystems may include antennas, radio transceivers, and infrared, optical ultrasonic, electromagnetic devices. Wired communication systems may include ports such as Ethernet, USB ports, serial ports, or other types of port to establish a wired connection to the drone with other devices, such as a ground control system, cloud-based system, or other devices, for example a mobile phone, tablet, personal computer, display monitor, other network-enabled devices. The drone may use a light-weight tethered wire to a ground base station for communication with the drone. The tethered wire may be removeably affixed to the drone, for example via a magnetic coupler.

Navigation data logs may be generated by reading various information from the drone sensors and operating system and storing the information in non-volatile memory. The data logs may include a combination of various data, such as time, altitude, heading, ambient temperature, processor temperatures, pressure, battery level, fuel level, absolute or relative position, GPS coordinates, pitch, roll, yaw, ground speed, humidity level, velocity, acceleration, and contingency information. This foregoing is not meant to be limiting, and other data may be captured and stored in the navigation data logs. The navigation data logs may be stored on a removable media and the media installed onto the ground control system. Alternatively, the data logs may be transmitted to the base station, a secondary relay drone, command center or to the network system.

Modules, programs or instructions for performing navigation operations, contingency maneuvers, and other functions may be performed with the operating system. In some implementations, the operating system 1620 can be a real time operating system (RTOS), UNIX, LINUX, OS X, WINDOWS, ANDROID or other operating system. Additionally, other software modules and applications may run on the operating system, such as a navigation control module 1622, contingency module 1624, application module 1626, and database module 1628. Typically navigation critical functions will be performed using the drone processing system 1600. Operating system 1620 may include instructions for handling basic system services and for performing hardware dependent tasks.

In addition to the drone primary processing system 1600, a secondary processing system 1602 may be used to run another operating system to perform other functions. A drone secondary processing system 1602 can be a system of one or more computers, or software executing on a system of one or more computers, which is in communication with, or maintains, one or more databases. The drone secondary processing system 1602 can be a system of one or more processors 1694, graphics processors 1692, I/O subsystem 1693, logic circuits, analog circuits, associated volatile and/or non-volatile memory, associated input/output data ports, power ports, etc., and/or one or more software processing executing one or more processors or computers. Memory 1670 may include non-volatile memory, such as one or more magnetic disk storage devices, solid state hard drives, flash memory. Other volatile memory such a RAM, DRAM, SRAM may be used for storage of data while the drone is operational.

Ideally modules, applications and other functions running on the secondary processing system 1602 will be non-critical functions in nature, that is if the function fails, the drone will still be able to safely operate. In some implementations, the operating system 1672 can be based on a real time operating system (RTOS), UNIX, LINUX, OS X, WINDOWS, ANDROID or other operating system. Additionally, other software modules and applications may run on the operating system 1672, such as an application module 1678, database module 1680, and so on (e.g., modules 1672-1680). Operating system 1602 may include instructions for handling basic system services and for performing hardware dependent tasks.

Also, controllers 1646 may be used to interact and operate a payload sensor or device 1648, and other sensors or devices such as photographic camera 1649, video camera, infra-red camera, multispectral camera, stereo camera pair, Lidar, radio transceiver, sonar, laser ranger, altimeter, TCAS (traffic collision avoidance system), ADS-B (Automatic dependent surveillance-broadcast) transponder. Optionally, the secondary processing system 1602 may have coupled controllers to control payload sensors or devices.

Each of the processes, methods, and algorithms described in the preceding sections may be embodied in, and fully or partially automated by, code modules executed by one or more computer systems or computer processors comprising computer hardware. The code modules (or "engines") may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

In general, the terms "engine" and "module", as used herein, refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on one or more computer readable media, such as a compact discs, digital video discs, flash drives, or any other tangible media. Such software code may be stored, partially or fully, on a memory device of the executing computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage. Electronic Data Sources can include databases, volatile/non-volatile memory, and any memory system or subsystem that maintains information.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While certain example embodiments have been described, these embodiments have been presented by way of example only, and are not intended to limit the scope of the disclosure. Thus, nothing in the foregoing description is intended to imply that any particular element, feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

What is claimed is:

1. A system comprising:
   at least one relay drone configured to:
      remain within an unobstructed straight line to a base station;
      remain within an unobstructed straight line to a working drone;
      pass a working drone control signal received from the base station to the working drone for the base station to control the working drone, and
      pass a collected information data signal received from the working drone to the base station.

2. The system of claim 1, wherein the at least one relay drone comprises:
   a first relay drone configured to remain within the unobstructed straight line to the base station; and
   a second relay drone configured to remain within the unobstructed straight line to the working drone, the first relay drone configured to remain within a line of sight of the second relay drone.

3. The system of claim 1, wherein the unobstructed straight line to the working drone comprises an unobstructed linear relationship sufficient for unidirectional wireless communication between the at least one relay drone and the working drone.

4. The system of claim 1, wherein the unobstructed straight line to the base station comprises an unobstructed linear relationship sufficient for a cable to be tethered between the at least one relay drone and the base station.

5. The system of claim 1, wherein a first distance between the at least one relay drone and the working drone is an order of magnitude greater than a second distance between the at least one relay drone and the base station.

6. The system of claim 1, wherein the at least one relay drone is configured to move in response to base station movement to remain within the unobstructed straight line to the base station.

7. The system of claim 1, wherein the at least one relay drone is configured to receive a relay drone control signal, from the base station, that controls the relay drone.

8. The system of claim 7, wherein the relay drone control signal is not passed to the working drone.

9. The system of claim 8, wherein the relay drone control signal configures the at least one relay drone to adopt an autonomous flight pattern within a set distance from the base station.

10. The system of claim 1, wherein the at least one relay drone comprises:
    an omnidirectional antenna configured to receive a location signal from the working drone;
    a first directional antenna configured to receive the working drone control signal; and a second directional antenna configured to send the working drone control signal.

11. The system of claim 10, wherein the omnidirectional antenna is on an opposite end of the at least one relay drone relative to the first directional antenna.

12. The system of claim 1, wherein the base station is not within the unobstructed straight line to the working drone.

13. The system of claim 1, wherein the at least one relay drone is not a fixed wing drone.

14. The system of claim 1, wherein the at least one relay drone is a multi-copter drone.

15. The system of claim 1, wherein the at least one relay drone is a glider tethered to the base station.

16. The system of claim 1, wherein the at least one relay drone is configured to receive a location signal from the working drone, the location signal including GPS coordinates and an altitude.

17. The system of claim 1, wherein the at least one relay drone is configured to:
remain within an unobstructed straight line to a second working drone;
pass a second working drone control signal received from the base station to the second working drone; and
pass a second data signal received from the second working drone to the base station.

18. The system of claim 17, wherein the at least one relay drone comprises a single drone configured to:
pass the working drone control signal received from the base station to the working drone via a first directional antenna on the single drone; and
pass the second working drone control signal from the base station to the second working drone via a second directional antenna on the single drone.

19. The system of claim 1, wherein the working drone is configured for autonomous flight.

20. The system of claim 1, wherein the working drone is configured for autonomous movement on ground.

21. The system of claim 1, wherein the working drone is a communication device.

22. The system of claim 1, wherein the at least one relay drone comprises a directional antenna that points below at the base station.

23. The system of claim 22, wherein the directional antenna is oriented with a gimbal.

24. The system of claim 23, wherein the at least one relay drone comprises a second directional antenna that points at the working drone.

25. The system of claim 24, wherein the second directional antenna is oriented with a second gimbal.

26. The system of claim 1, wherein the at least one relay drone is configured to move from a first location to a second location with increased signal reception with the base station relative to the first location.

27. The system of claim 26, wherein the signal is the working drone control signal or the collected information data signal.

* * * * *